US012688465B2

(12) United States Patent
Ghanem et al.

(10) Patent No.: US 12,688,465 B2
(45) Date of Patent: \*Jul. 21, 2026

(54) LEARNING SOFTWARE ASSISTED FIXTURELESS OBJECT PICKUP AND PLACEMENT SYSTEM AND METHOD

(71) Applicant: ProcessChamp, LLC, Columbus, OH (US)

(72) Inventors: George K. Ghanem, Columbus, OH (US); Joseph A. Ghanem, Columbus, OH (US)

(73) Assignee: ProcessChamp, LLC, Columbus, OH (US)

( \* ) Notice: Subject to any disclaimer, the term of this patent is extended or adjusted under 35 U.S.C. 154(b) by 87 days.

This patent is subject to a terminal disclaimer.

(21) Appl. No.: 18/785,810

(22) Filed: Jul. 26, 2024

(65) Prior Publication Data

US 2024/0386329 A1 Nov. 21, 2024

Related U.S. Application Data

(63) Continuation of application No. 17/078,611, filed on Oct. 23, 2020, now Pat. No. 12,106,188, which is a
(Continued)

(51) Int. Cl.
*G06N 20/00* (2019.01)
*G05B 19/4155* (2006.01)

(52) U.S. Cl.
CPC ......... *G06N 20/00* (2019.01); *G05B 19/4155* (2013.01); *G05B 2219/50358* (2013.01)

(58) Field of Classification Search
None
See application file for complete search history.

(56) References Cited

U.S. PATENT DOCUMENTS 5,771,553 A 6/1998 Sim et al.
5,848,747 A 12/1998 Nishi
(Continued)

FOREIGN PATENT DOCUMENTS

CN 207104216 U \* 3/2018
WO WO2005087451 A1 9/2005
(Continued)

OTHER PUBLICATIONS

Wired, How the Tesla Model S is Made—Tesla Motors Part 1 youtube video webpage, Jul. 16, 2013, 2 pages.

*Primary Examiner* — Arslan Azhar
(74) *Attorney, Agent, or Firm* — Standley Law Group LLP; Jeffrey S. Standley; Adam J. Smith

(57) ABSTRACT

Systems and methods for learning software assisted, fixtureless object pickup and placement include a controller which derives measured target points from image(s) of a part in a work area received from a machine vision system, performs an iterative analysis to determine a best fit solution for moving the part adjacent to another part for forming the assembly such that each of the measured target points is within a predetermined range of an associated one of desired target points for said part, where the other part is located at support object(s). The controller converts the measured target points to a common reference frame and command movement of the part, by way of the robot, according to said best fit solution as converted such that the part is moved and secured adjacent to the other part in a fixtureless manner.

20 Claims, 32 Drawing Sheets

Related U.S. Application Data continuation-in-part of application No. 16/664,443, filed on Oct. 25, 2019, now Pat. No. 11,559,897.

(60) Provisional application No. 62/751,014, filed on Oct. 26, 2018.

(56) References Cited

U.S. PATENT DOCUMENTS

| | | |
|---|---|---|
| 6,273,483 B1 | 8/2001 | Bone |
| 6,381,556 B1 | 4/2002 | Kazemi et al. |
| 8,180,487 B1 | 5/2012 | Vangal-Ramamurthy et al. |
| 10,049,443 B2 | 8/2018 | Bartos et al. |
| 10,095,214 B2 | 10/2018 | Ghanem |
| 10,101,725 B2 | 10/2018 | Ghanem |
| 10,551,179 B2 | 2/2020 | Lonsberry et al. |
| 10,571,889 B2 | 2/2020 | Ghanem |
| 10,591,277 B2 | 3/2020 | Kallay et al. |
| 11,029,713 B2 | 6/2021 | Haven et al. |
| 2006/0153525 A1 | 7/2006 | Treves et al. |
| 2013/0329012 A1 | 12/2013 | Bartos et al. |
| 2014/0081458 A1 | 3/2014 | Shimono |
| 2014/0277733 A1 | 9/2014 | Kouno et al. |
| 2015/0104284 A1 | 4/2015 | Riedel |
| 2015/0120054 A1 | 4/2015 | Watanabe |
| 2015/0190926 A1 | 7/2015 | Miegel et al. |
| 2018/0043540 A1 | 2/2018 | Satou |
| 2018/0120218 A1 | 5/2018 | Shultis et al. |
| 2019/0049920 A1 | 2/2019 | Ghanem |
| 2019/0076949 A1 | 3/2019 | Atherton et al. |
| 2019/0138009 A1 | 5/2019 | Saito et al. |
| 2019/0143541 A1 | 5/2019 | Nemallan |
| 2019/0331480 A1 | 10/2019 | Lonsberry et al. |
| 2019/0332084 A1 | 10/2019 | Haven |
| 2020/0130189 A1 | 4/2020 | Ghanem |
| 2020/0240772 A1 | 7/2020 | Lonsberry et al. |
| 2020/0262057 A1 | 8/2020 | Saez et al. |
| 2020/0262078 A1 | 8/2020 | Saez et al. |
| 2020/0262079 A1 | 8/2020 | Saez et al. |
| 2020/0377004 A1 | 12/2020 | Zhang et al. |
| 2020/0377012 A1 | 12/2020 | Saez et al. |
| 2020/0380273 A1 | 12/2020 | Saez et al. |
| 2020/0398743 A1 | 12/2020 | Huber et al. |
| 2021/0150760 A1 | 5/2021 | Haven et al. |
| 2021/0237200 A1 | 8/2021 | Wang et al. |
| 2021/0237211 A1 | 8/2021 | Saez et al. |
| 2021/0237212 A1 | 8/2021 | Saez et al. |
| 2022/0152785 A1 | 5/2022 | Skurkis et al. |
| 2022/0176564 A1 | 6/2022 | Saez et al. |

FOREIGN PATENT DOCUMENTS

| | | | |
|---|---|---|---|
| WO | WO2005105389 A1 | 11/2005 | |
| WO | WO2009140977 A1 | 11/2009 | |

* cited by examiner

216

241

241A

Y

241B

X

239

236

250

250

283

283

250

250

281

250

250

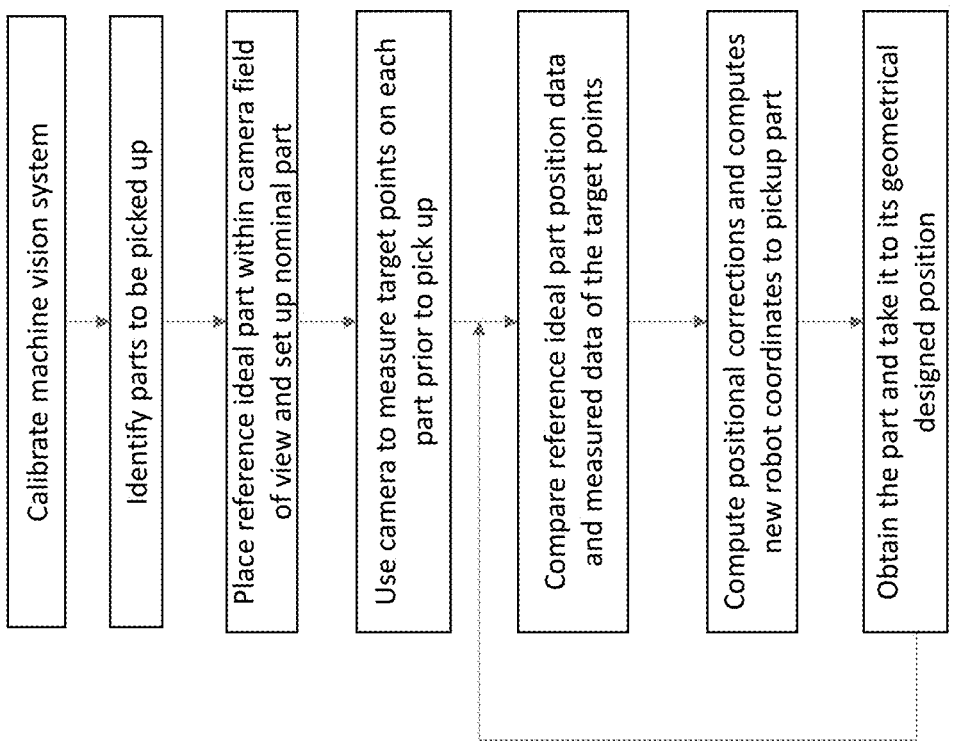

Calibrate machine vision system

Identify parts to be picked up

Place reference ideal part within camera field of view and set up nominal part

Use camera to measure target points on each part prior to pick up

Compare reference ideal part position data and measured data of the target points Compute positional corrections and computes new robot coordinates to pickup part Obtain the part and take it to its geometrical designed position

Processor

Memory

Assembly table

Workpiece table

Target point table

A.I. Optimizing Algorithm

Figure 26A

LEARNING SOFTWARE ASSISTED FIXTURELESS OBJECT PICKUP AND PLACEMENT SYSTEM AND METHOD

CROSS-REFERENCE TO RELATED APPLICATIONS

This application is a continuation of U.S. application Ser. No. 17/078,611 filed Oct. 23, 2020, which is a continuation-in-part of U.S. application Ser. No. 16/664,443 filed Oct. 25, 2019, which claims the benefit of U.S. Provisional Application Ser. No. 62/751,014 filed Oct. 26, 2018, the disclosures of each of which are hereby incorporated by reference as if fully restated.

TECHNICAL FIELD

Exemplary embodiments relate generally to systems and methods for learning software assisted fixtureless object pickup and placement.

BACKGROUND AND SUMMARY OF THE INVENTION

Dedicated hardware fixtures are often used to secure and locate sheet metal parts for welding. Such sheet metal parts may be welded together to create subassemblies, which may subsequently be used to make a larger product. A common example of where such processes are utilized is the automobile manufacturing industry. Regardless, a unique fixture must generally be designed and manufactured to accommodate each subassembly. While some so-called flexible fixture systems are available, the costs of designing and manufacturing such flexible fixture systems are significant due to the complexity of design required to accommodate even minor changes. Furthermore, even such flexible fixture systems may be quickly rendered obsolete upon the introduction of product changes. For example, without limitation, in the automobile industry, such fixture systems may need updating with each model or production line change. The average costs for fixturing in an automotive assembly plant is estimated to be $150-300 million every 3-4 years. The use of robots and other automated assembly systems to perform material handling and joining are known. For example, many Integrators of robots and automated assembly systems are available in various industries. As another example, robots and automated assembly systems using fixtures to provide physical datum points are known, such as are described in U.S. Pat. No. 10,095,214 issued Oct. 9, 2018 and U.S. Pat. No. 10,101,725 issued Oct. 16, 2018. While the use of such robots and automated assembly systems may reduce certain expenses and provide improved consistency in manufacturing, what is needed is the ability to utilize learning A.I. software to replace fixtures and physical datums with virtual datums.

In accordance with the present invention, a reconfigurable, fixtureless manufacturing system and method assisted by learning A.I. software is provided. One or more material handling robots may be provided at an assembly area. The assembly area may be located within a manufacturing facility, for example without limitation. One or more joining robots may be provided at the assembly area. Each of the material handling robots may be configured to selectively engage any of a number of material handling devices. Each of the material handling devices may comprise one or more gripping elements, grippers, clamps, some combination thereof, or the like. Each of the material handling devices may be configured to grasp a number of differently shaped parts. In exemplary embodiments, such parts are grasped by inserting a first gripping element of a given material handling device into a locating hole on the part and pressing a second and third gripping element against walls of the part, preferably on opposing sides of the locating hole.

A given material handling robot may grasp a given part with a given material handling device and may move the part to a particular location within the assembly area where the material handling device may be replaced from the material handling robot in order to accommodate a different part's family sizes and shapes. In other exemplary embodiments, the material handling robot may instead hold the material handling device at the particular location within the assembly area. In exemplary embodiments, a number of parts may be stacked or otherwise adjoined to one another to form a subassembly within the assembly area. Such parts may be stacked or otherwise adjoined at a docking station. The docking station may be placed atop an autonomous guide vehicle (AGV) or mounted to the floor.

A machine vision system may perform an alignment scan of the subassembly. The machine vision system may be configured to capture the location of selected datums of the subassembly. The datums may be particular features of or locations on the subassembly. The machine vision system may transmit the location of such datums to a controller. The controller may compare the location of the scanned datums with predetermined locations to determine a best fit for the parts to create the subassembly stored at the learning A.I. software. If needed, the parts may be adjusted spatially. The process for determining the best fit and providing spatial adjustment may be as shown and described in U.S. Pat. No. 10,095,214 issued Oct. 9, 2018 and U.S. Pat. No. 10,101,725 issued Oct. 16, 2018, which are hereby incorporated by reference herein in their entireties. The one or more joining robots may join the parts, such as by welding, fastening, or riveting, some combination thereof, or the like to complete the subassembly. The material handling device and/or the material handling robots may be disabled from movement during the joining process to apply breaking effect, other methods can also be utilized to apply breaking to hold parts in position while joining. The machine vision system may perform an inspection scan of the completed subassembly. Any discrepancies between the inspection scan and the alignment scan may be transmitted to the learning A.I. software by way of the controller. Additional methods include embedding the best fit A.I. algorithms directly in the camera processor or in the robot controller software to minimize and eliminate additional hardware and cabling. The learning A.I. software may be configured to adjust the stored datums to compensate for such discrepancies when producing the next subassembly. This machine learning process may permit optimization of the assembly process through multiple production iterations of a given subassembly. The flexibility of the material handling devices and the use of the learning A.I. software may provide the ability to use the same, or a substantially similar, system to handle and join a number of differently shaped, sized, arranged, or the like, parts in a number of different orientations to produce a number of differently shaped, sized, arranged, or the like, subassemblies or assemblies which may be improved through each manufacturing iteration. Furthermore, the use of material handling robots and material handling devices to secure the parts may provide a fixtureless assembly process. By storing the virtual datums, the need for a physical fixture to provide physical datum points may be eliminated or significantly reduced.

In exemplary embodiments, one or more components of the machine vision system may be configured to determine if a worker or other individual is within the assembly area. Movement of the material handling robots may be prevented or halted while the individual is within the assembly area. The material handling robots may be configured to grasp one or more parts and move them into an assembly position for an inspection scan be the machine vision system to verify that certain features are present and properly aligned. In such embodiments, the reconfigurable manufacturing systems and methods may operate for part inspection and verification and joining need not necessarily be performed, though subsequent joining is contemplated.

Other types and kinds of handling may be desirable. For example, it may be desirable to pick up a particular part from among a number of parts and place it in a new location. The new location may be adjacent to other parts to form part of all of a subassembly or assembly, such as but not limited to, in a docking device, as held by other robots, on a table or other surface, or the like. This is particularly common in a mass manufacturing process, such as an assembly line where parts are continuously made to make larger articles. However, two subsequent parts are generally not identical. They may be shifted in orientation when presented to a robot, be of various sizes or shapes (usually within a given tolerance), or the like. This may lead to difficulty in joining the two or more parts in a way which preserves the overall intended design of the subassembly or assembly. Therefore, what is needed is learning software assisted, fixtureless object pickup and placement systems and methods.

Systems and methods for learning software assisted, fixtureless object pickup and placement are provided. A workpiece table may be stored at a controller. The workpiece table comprises a list of parts, such as by part identifier, which form an assembly. An assembly table may be stored at the controller. The assembly table comprises a list of desired assemblies, such as by assembly identifier. A target points table may be stored at the controller. The target points table may comprise one or more desired target points for each part. The target point table may initially be populated with actual measurement data, such as obtained by the machine vision system of each actual part and/or the location where the part is to be finally placed. For example, measurements may be made of a docking station for the part or of the part to which the part being handled is to be joined. The target points may reflect actual or virtual datums on the part. Each target point may be weighted to reflect tolerances desired between the parts of the assembly. Each part may be associated with multiple target points, which may reflect surfaces or features of the part and/or desired locations of the same to form the assemblies. The desired target points may be selected relative to one another to fit the various parts into the desired subassembly or assembly. The desired target points may be determined from a scan of a reference, idealized part.

One or more computers may designate an origin at a common reference frame. The computer(s) may represent coordinates of a docking station as variables in the target point table. The computer(s) may express all measured coordinates in the common reference frame. The computer (s) may construct one or more matrices of ordered pairs to represent each pair of mating target points of the actual measured locations of the target points and final, desired target point locations for each part and store these ordered pairs as calculated coordinates in the target point table. The initial, measured target point locations may be determined by a scan of one or more parts by a machine vision system. The desired target point locations may be pre-programmed or may be provided with reference to an idealized part.

Assuming the actual, measured locations do not align with, or are not within a predetermined range of, the desired target point locations, the controller may utilize an iterative, learning software algorithm to determine a best fit solution for movement of the part(s) to be within predetermined range of the desired target points. The best fit solution may be determined by applying vectors in virtual space between the actual measured target points and the desired target points of the part. The algorithm may be configured to prioritize the solution based on the weights associated with each target point. As such, the algorithm may select the solution among the calculated potential solution sets which minimalizes the need to shift the parts but fits the desired target points with priority given to higher weighted target points, such that those higher weighted target points are associated with the smallest vectors. Upon finding a best fit, the controller may determine the positions of all material handling robots. The controller may then cause the material handling robots to pick up and place each part to form the assembly. One or more steps may be repeated, as needed, to form the same or different assemblies.

For example, without limitation, a second set of parts may be received for a second assembly where the exact position of the parts may differ from those used to create a first assembly. The machine vision software may determine the location of various target points for the second set of parts and may determine how the material handling robots should shift or be adjusted to grasp the repositioned parts. This may be realized by, for example without limitation, by determining vectors between the desired position of each target point and the measured position of said target points. A solution which minimizes the overall length of all such vectors may be selected while still giving priority to higher weighted target points such that the vectors associated with such higher weighted target points are smaller or smallest.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 26A is a simplified block diagram of an exemplary controller for use with the system of FIG. 19;

FIG. 26B is a flowchart with exemplary logic for use with the controller of FIG. 26A;

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
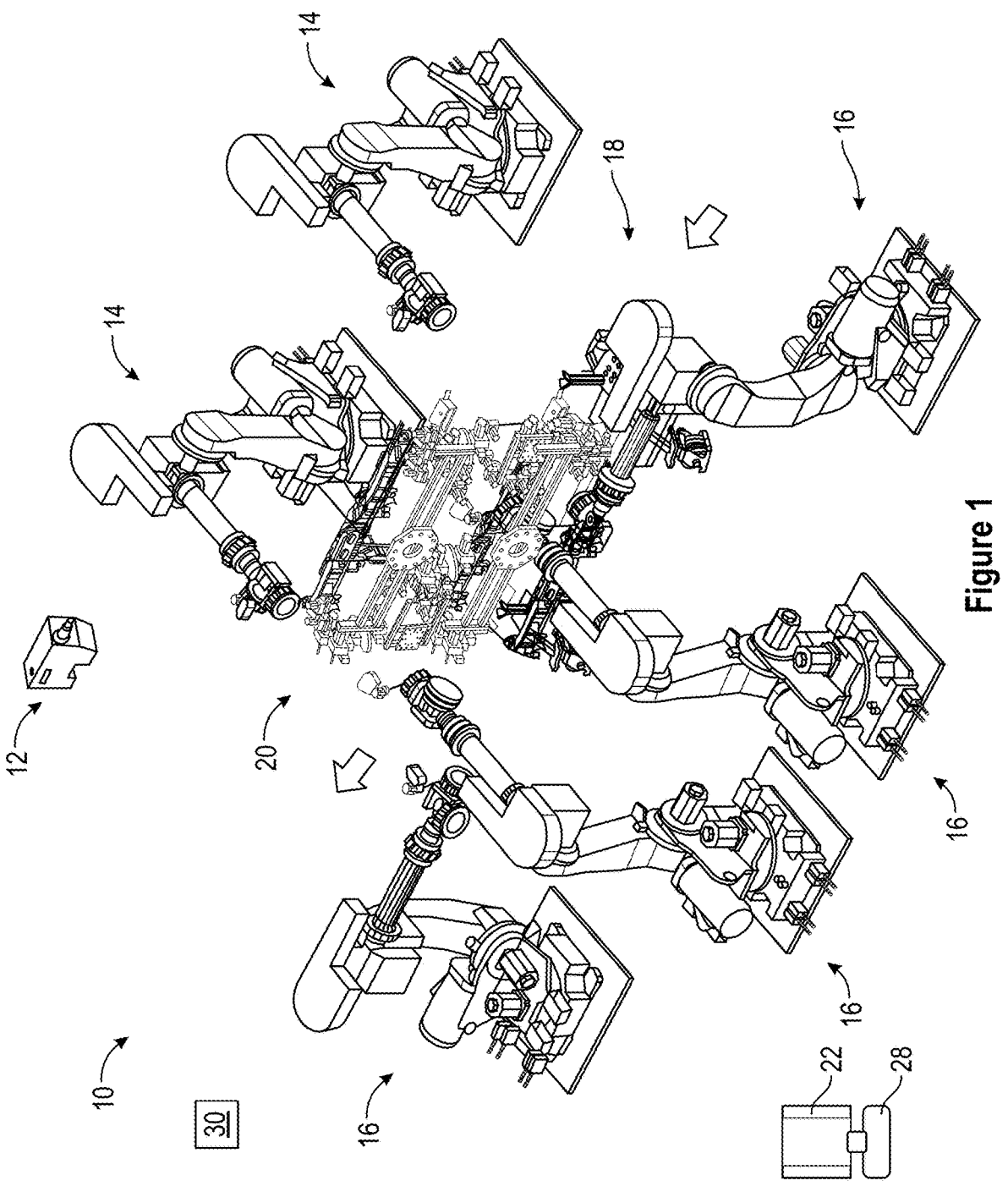
FIG. 1 is a perspective view of an exemplary A.I. driven reconfigurable/fixtureless manufacturing system of the present invention.

FIG. 1 illustrates an exemplary AI driven fixtureless and reconfigurable manufacturing system 10. The system 10 may comprise a machine vision system 12. The machine vision system 12 may comprise one or more cameras, lasers, radar, proximity detectors, ultrasonic, photo eyes, some combination thereof, or the like. Any location, number, orientation, arrangement, and the like of components of the machine vision system 12 is contemplated.

The system 10 may comprise one or more joining robots 14. The joining robots 14 may have a material handling end of arm tooling that be configured for movement in nine dimensions (degrees of freedom). The joining robots 14 may be configured to perform welding, fastening, riveting, connecting, joining, some combination thereof, or like functions. In exemplary embodiments, the joining robots 14 may be configured to selectively receive any one of a number of joining devices 34. Each joining device 34 may be configured to perform one or more particular joining techniques. For example, without limitation, a given joining device 34 may comprise a welding torch, a screw driver, a riveter, adhesive gun, some combination thereof, or other similar connection tool functions. In other exemplary embodiments, such joining devices 34 may be permanently attached to the joining robots 14. Although two joining robots 14 are illustrated in FIG. 1, any number of joining robots 14 are contemplated of the same or different types. Using the geometry datum setting A.I., allows the joining robots 14 and the material handling robots 16 to be arranged in various ways, depending on the complexity of the part assemblies in order to handle a complete parts family without changing of the physical layout and removing part dedicated tooling figures, around an assembly area 18.

The system 10 may comprise one or more material handling robots 16. The material handling robots 16 may have an end of arm tooling that can be configured for movement in 9 dimensions (degrees of freedom). In exemplary embodiments, the material handling robots 16 may be configured to handle any one of a number of material handling devices 32. Each material handling device 32 may be configured to grasp any one of a number of parts. In other exemplary embodiments, such material handling devices 32 may be attached to the material handling robots 16. Although four material handling robots 16 are illustrated in FIG. 1, any number of material handling robots 16 are contemplated of the same or different types. The material handling robots 16 may be arranged around the assembly area 18.

The joining robots 14 and material handling robots 16 may be arranged to perform operations on a subassembly 20 located within the assembly area 18. The machine vision system 12 may be positioned to view some or all of the assembly area 18. The machine vision system 12 may be within sufficient proximity and view of the assembly area 18 to be capable of optically scanning the subassembly 20. In exemplary embodiments, the subassembly 20 may be transported into and out of the assembly and weld areas 18 by way of an AGV 28, though any type of transportation for the subassembly 20 is contemplated.

One or more bins 22 may be positioned around the assembly area 18. Each of the bins 22 may be configured to hold one or more types of parts 26. In exemplary embodiments, at least one bin 22 may be placed in reach of each of the material handling robots 16, though any number and arrangement of the bins 22 is contemplated. Each of the bins 22, in exemplary embodiments, may be tugged by and material handling AGV (not illustrated here) so that the bin 22 is moveable. For example, without limitation, the material handling AGV may move a given bin 22 to be in reach of a given material handling robot 16 and subsequently move the given bin 22 to be in reach of another material handling robot 16.

In exemplary embodiments, the machine vision system 12, each of the material handling robots 16, each of the joining robots 14, each of the bins 22, and various components thereof may be in electronic communication with a controller 30. Such communication may be accomplished by wired connections, wireless connections, some combination thereof, or the like. The controller 30 may comprise one or more electronic storage devices and one or more processors. Executable learning A.I. software instructions may be stored at the one or more electronic storage devices which when executed by the one or more processors configure the one or more processors to perform the functions and steps described herein. It is also feasible to install the executable learning A.I. in an industrial PC, a camera, as part of robot software directly or indirectly, and other devices that may communicate with the controller 30 or have a more direct communications with the actuators or manipulator arms (servo slides, or robots).

Figure 2:
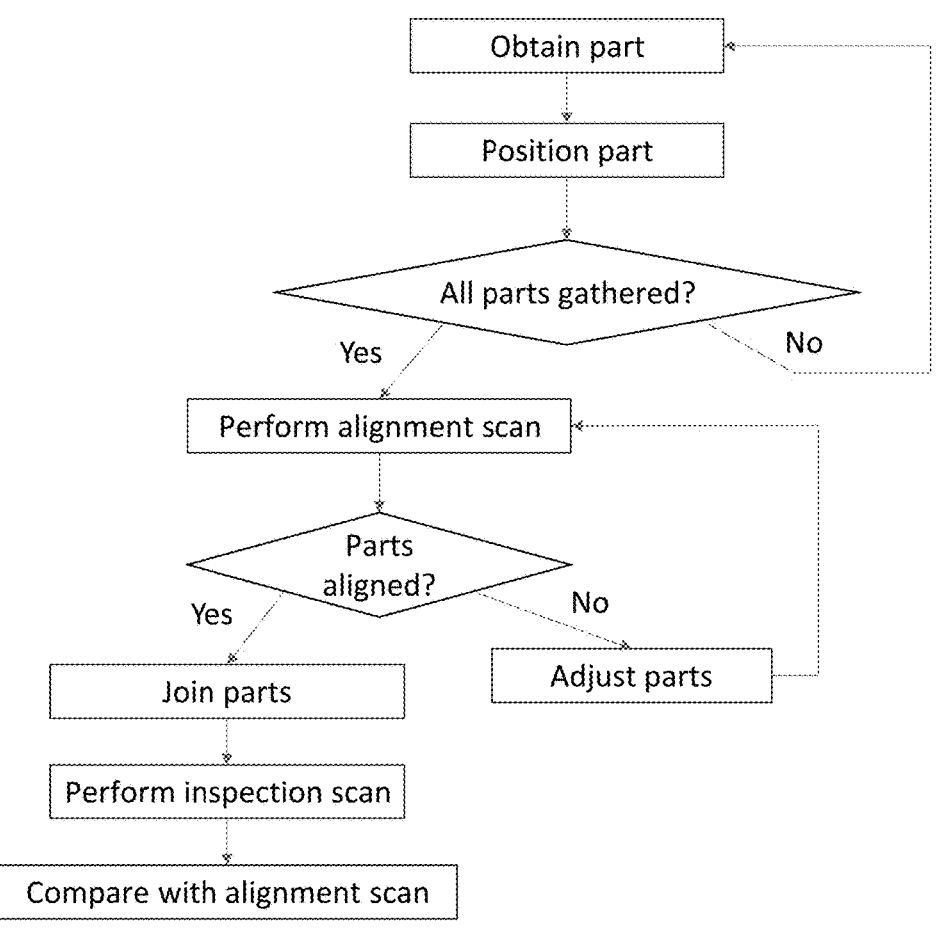
FIG. 2 is a flow chart with exemplary logic for use with the system of FIG. 1.

FIG. 2 illustrates an exemplary logic for operating the and AI driven fixtureless and reconfigurable manufacturing system 10. Each part 26 for a given subassembly 20 may be obtained. In exemplary embodiments, the parts 26 may be stored in, and obtained from, a respective part bin 22, though multiple types of parts may be stored in a given part bin 22.

Each part 26 may be locatable by way of an RFID chip, an optically scannable code, an indicator, a datum 40, some combination thereof, or the like. In exemplary embodiments, each of the material handling robots 16 and/or material handling devices 32 may comprise a component of the machine vision system 12 for identifying the part 26 for grasping. The datums 40 may be particular features of, or locations on, the parts 26 or the subassembly 20 which may be stored to product virtual datums 40. Virtual datums 40 may be stored at the controller 30 that represent the location of datums 40 of a properly joined subassembly 20. The learning A.I. algorithms preferably have the ability to handle at least hundreds of feature datum geometry settings at the same time.

A given material handling robot 16 may secure a given material handling device 32 to itself. A given part 26 may be gripped by the material handling device 32 secured to the material handling robot 16. The material handling robot 16 may move the part 26 and the material handling device 32 to a particular location within the assembly area 18. In exemplary embodiments, the material handling device 32 holding the part 26 may place that part at a docking station 24. This part may be a primary part. After positioning on the docking station, using camera and A.I., other parts can be placed relative to the primary part. This improves the subassembly quality due to part-to-part variation and tooling variation due to usage and tear and ware. The docking station 24 may be positioned on the floor or on an AGV 28 has been moved into the assembly area 18. Additional parts 26 may be gathered following substantially the same or similar steps as needed to compete the subassembly 20.

During, or as, all parts 26 are gathered, the machine vision system 12 may perform an alignment scan of the subassembly 20. The various parts 26 may comprise one or more datums 40 in the form of features of the various parts 26, such as but not limited to, locating apertures 19, edges, curved surfaces, protrusions, depressions, some combination thereof, or the like. The location of the datums 40 may be transmitted to the controller 30 where the learning AI algorithm may reside. The AI compares the location of the scanned datums 40 with the location of stored virtual datums 40 to determine a best fit for the parts to create the subassembly stored at the learning A.I. software. This feedback inspection information will be used by the AI in the following cycle to improve the quality and fit of the following subassembly during the next build cycle. The various parts 26 may be adjusted by the material handling devices 32 and/or the material handling robots 16 as needed. If adjustment is performed, the subassembly 20 may be rescanned and further adjustments may be made as needed. The process for determining the best fit and providing spatial adjustment may be as shown and described in U.S. Pat. No. 10,095,214 issued Oct. 9, 2018 and U.S. Pat. No. 10,101,725 issued Oct. 16, 2018, which are hereby incorporated by reference herein in their entireties.

The subassembly 20 may be secured. The subassembly 20 may be secured prior to, while, or after performing the alignment scan. In exemplary embodiments, the subassembly 20 may be secured by activating brakes on the material handling devices 32 and/or the material handling robots 16. Alternatively, or additionally, the subassembly 20 may be secured by deactivating motors on the material handling devices 32 and/or the material handling robots 16. Another approach is the utilization of gripping system that can allow the part to be kinematically held without the use of excessive force or the use of a breaking mechanism.

The position of the datums 40 of the various parts 26 as detected by the machine vision system 12 may be transmitted to the joining robots 14. The various parts 26 of the subassembly 20 may be joined by the joining robots 14. The subassembly 20 may be, or may remain, secured during joining of the parts 26.

After joining the parts 26 to form a completed subassembly 20, the material handling devices 32 may be unsecured. The material handling devices 32 may be removed from the assembly area 18 by the material handling robots 16. An inspection scan may then be performed by the machine vision system 12 to locate the various datum 40. The location of the datums 40 from the inspection scan may be compared against the stored virtual datums 40 and/or the location of the datums 40 from the alignment scan to determine if any discrepancies arise. Such comparison may be performed at the controller 30, though any location is contemplated. Any discrepancies between the inspection scan and the alignment scan may be transmitted to the learning A.I. software by way of the controller 30. The learning A.I. software may be configured to compute the adjustment vectors needed to be applied to the parts to in order for the assembly to comply with the stored virtual datums 40 and to compensate for any discrepancies when producing the next subassembly 20 as further described herein. This machine learning process may permit optimization of the assembly process through multiple production iterations of a given subassembly 20. The flexibility of the material handling robots 16 and material handling devices 32 and the use of the learning A.I. software may provide the ability to use the same, or a substantially similar, system to handle and join a number of differently shaped, sized, arranged, or the like, parts 26 in a number of different orientations to produce a number of differently shaped, sized, arranged, or the like, subassemblies 20 or assemblies which may be improved through each manufacturing iteration. Furthermore, the use of material handling robots 16 and material handling devices 32 to secure the parts 26 may provide a true A.I. driven fixtureless assembly process. By storing the virtual datums 40 in the A.I. Software (virtually), the need for a physical fixture to provide physical datum points may be eliminated or significantly reduced.

Figure 3:
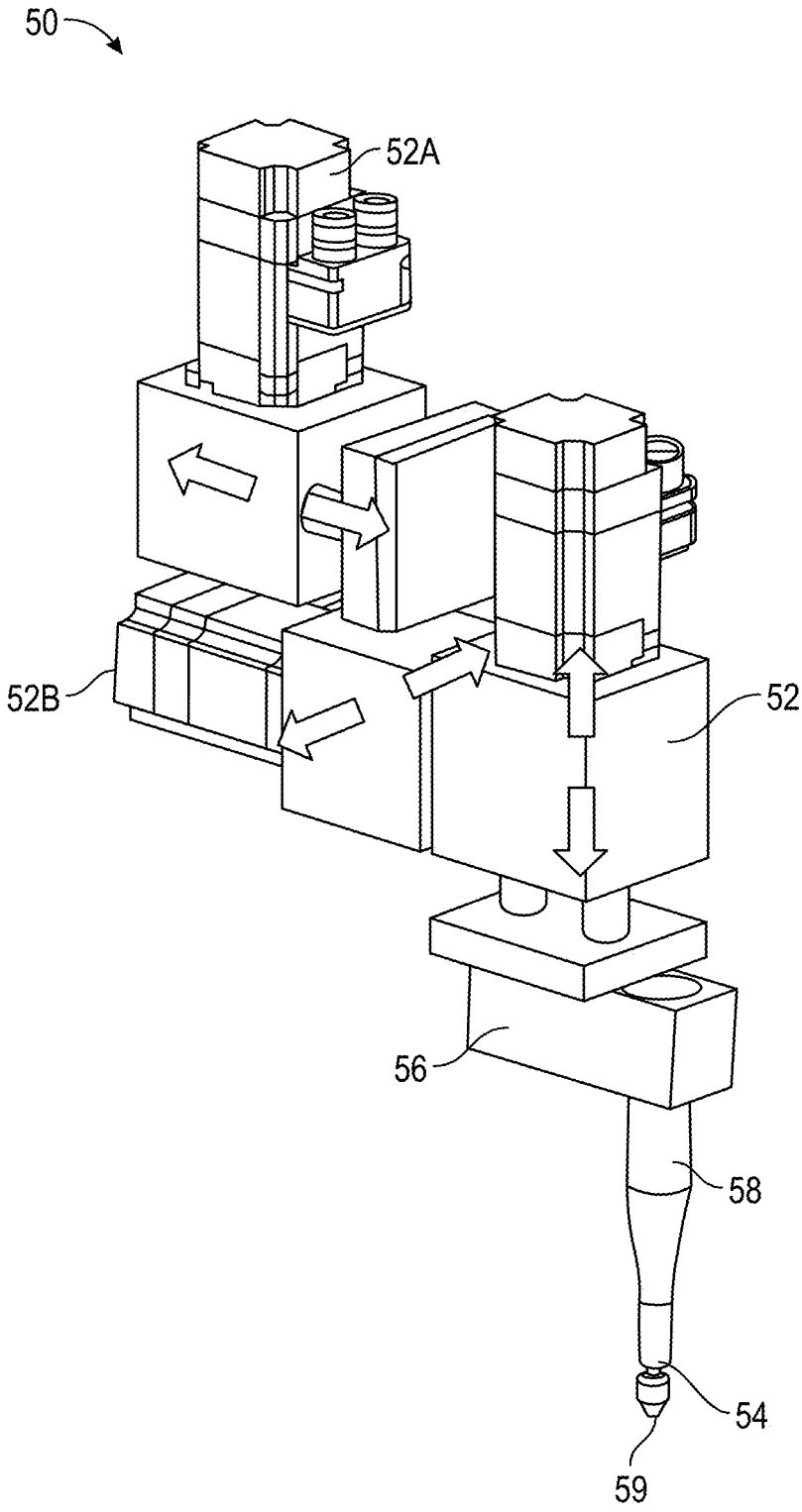
FIG. 3 is a perspective view of an exemplary gripping element of the present invention for use with the system of FIG. 1.

FIG. 3 illustrates an exemplary gripping element 50. Each of the material handling devices 32 may comprise one or more gripping elements 50. Each gripping element 50 may comprise one or more motors 52A-C, such as but not limited to, servos. Each motor 52A-C may be configured to move the gripping element 50 in a given dimension (e.g., x, y, or z plane or orientation). Three motors 52A-C may be used such that the gripping element 50 is capable of movement in three dimensions. Each gripping element 50 may comprise a base 56. Each gripping element 50 may comprise one or more protrusions 58. The protrusions 58 may extend from the base 56.

The base 56 may be substantially cuboid in shape, though any shape is contemplated. The protrusion 58 may comprise cylindrical and/or conical shaped sections. The protrusion 58 may comprise a ring-shaped indent 54 located near a tip 59 of the protrusion 58. Any size or shape protrusion 58 is contemplated including but not limited to, grippers, claws, tweezers, clamps, hooks, suction devices, vacuums, some combination thereof, or the like. Any number of protrusions 58 may be provided on a given base 56. The protrusion 58, the base 56, or other portions of the gripping element 50 may comprise one or more datums 40.

Figure 4:
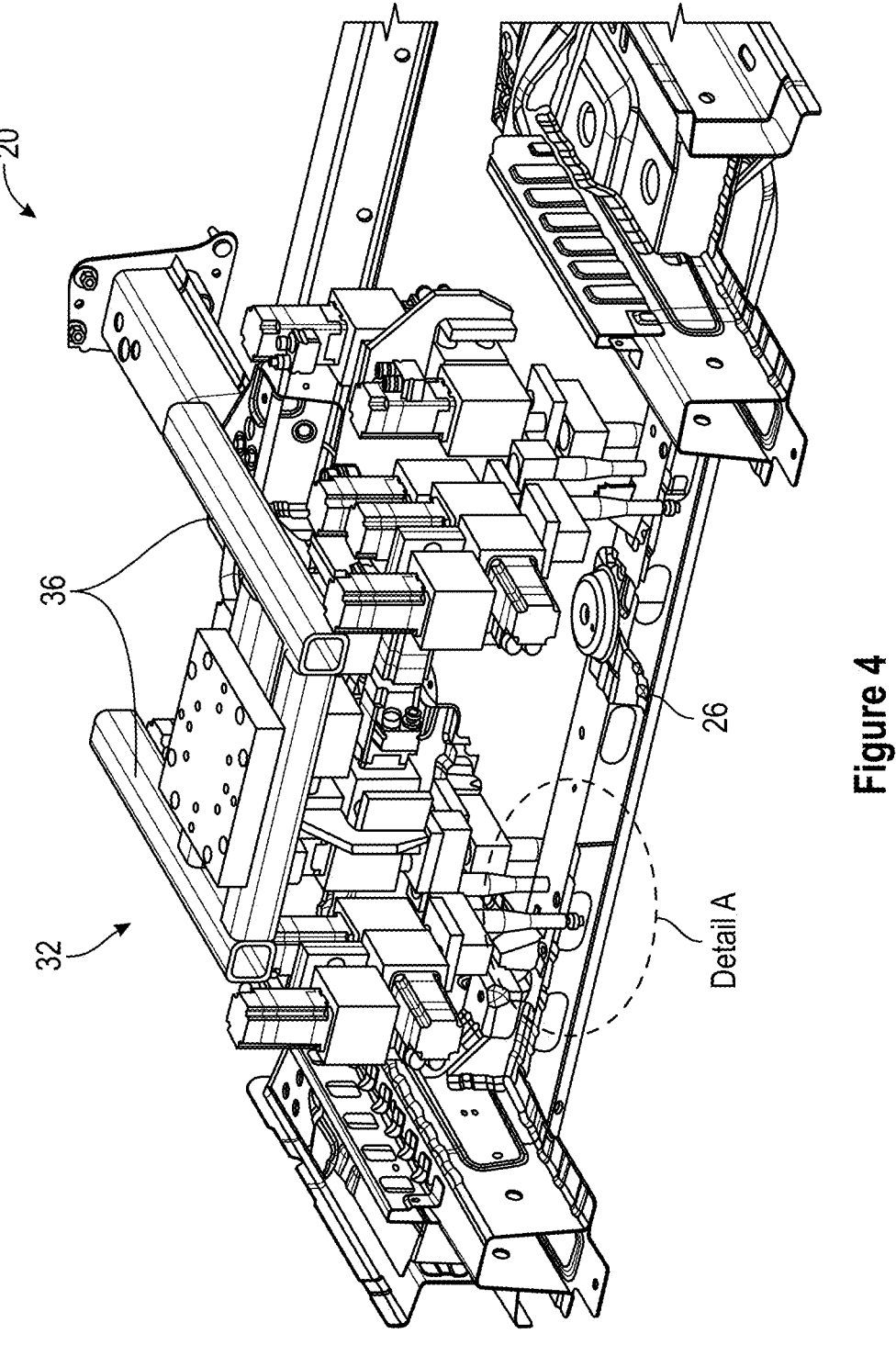
FIG. 4 is a perspective view of an exemplary material handling device for use with the system of FIG. 1, also indicating detail A.
Figure 5:
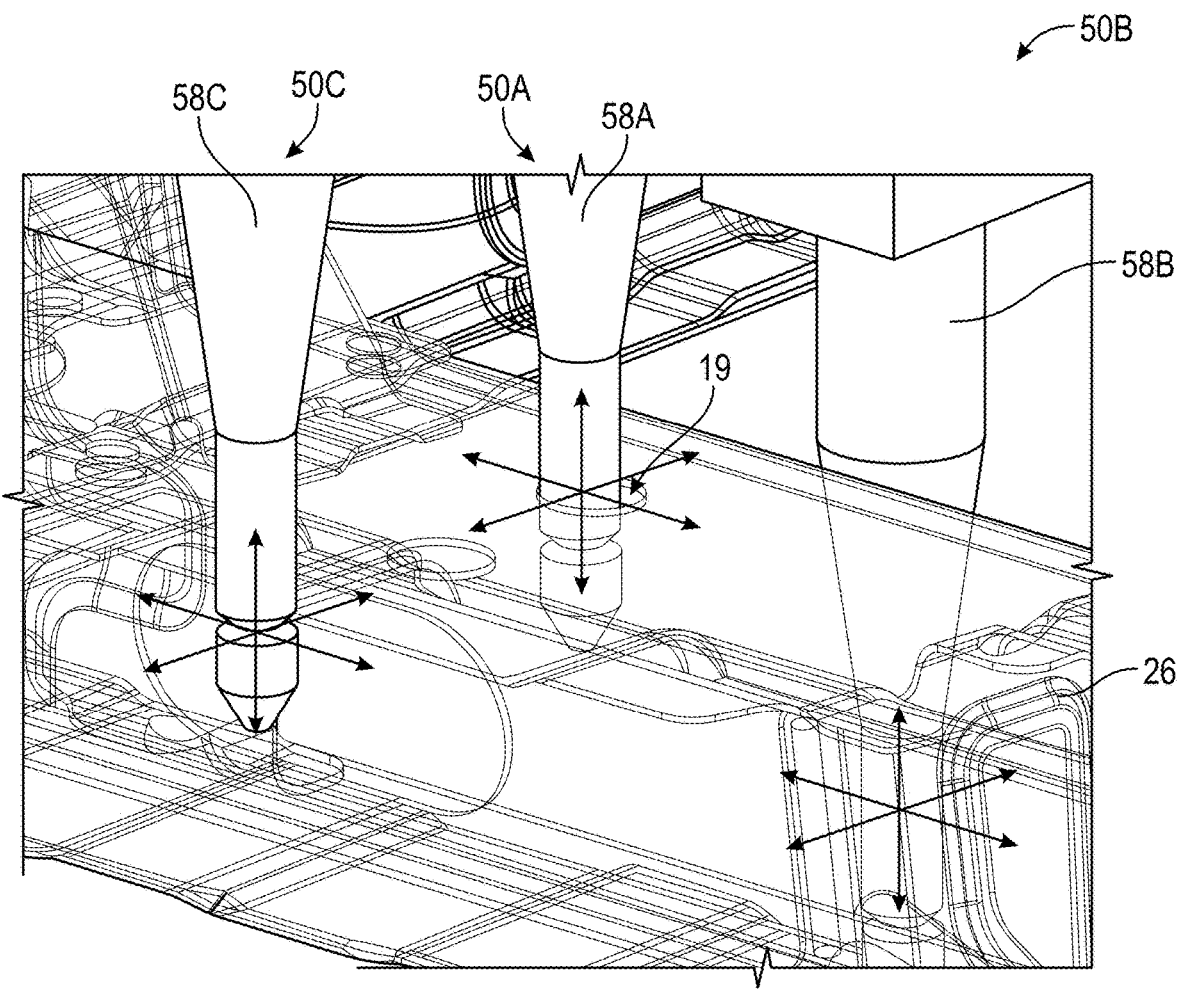
FIG. 5 is a detailed perspective view of detail A of FIG. 4 with the part rendered translucent so that additional components of the material handling device are visible.
Figure 6A:
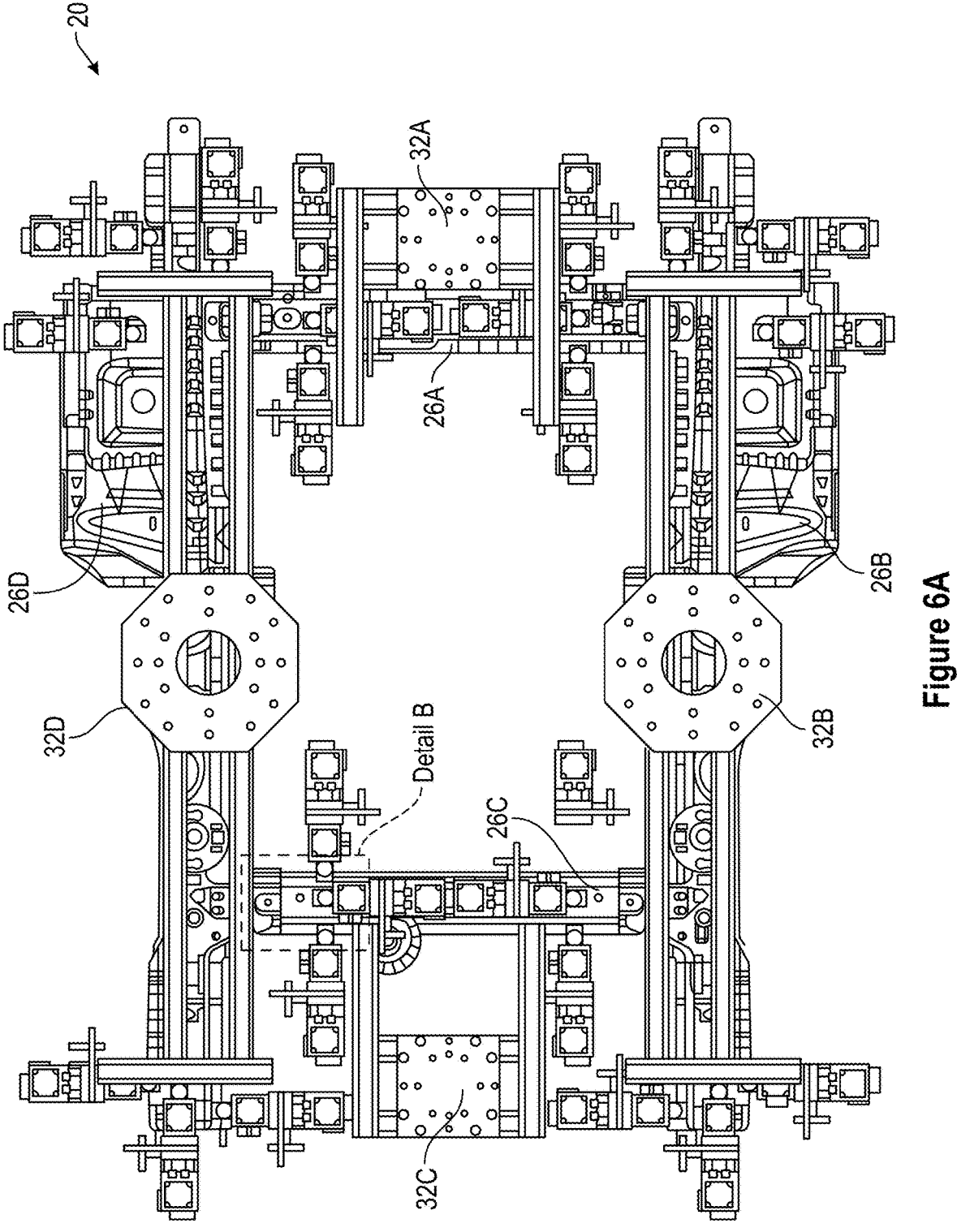
FIG. 6A is a top view of a subassembly and material handling devices of the system of FIG. 1 shown in isolation, also indicating detail B.
Figure 6B:
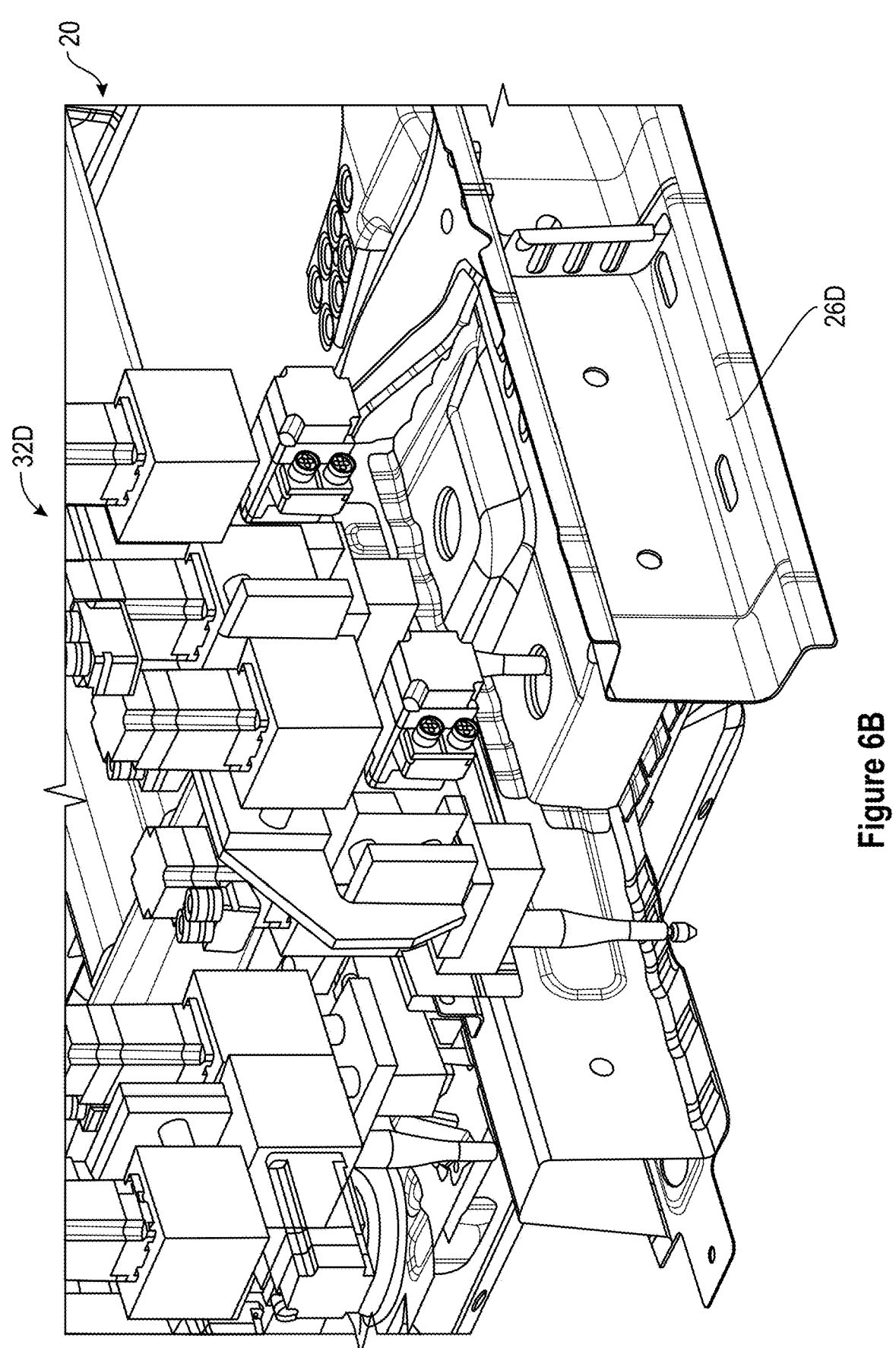
FIG. 6B is a perspective view of a portion of FIG. 6A.
Figure 6C:
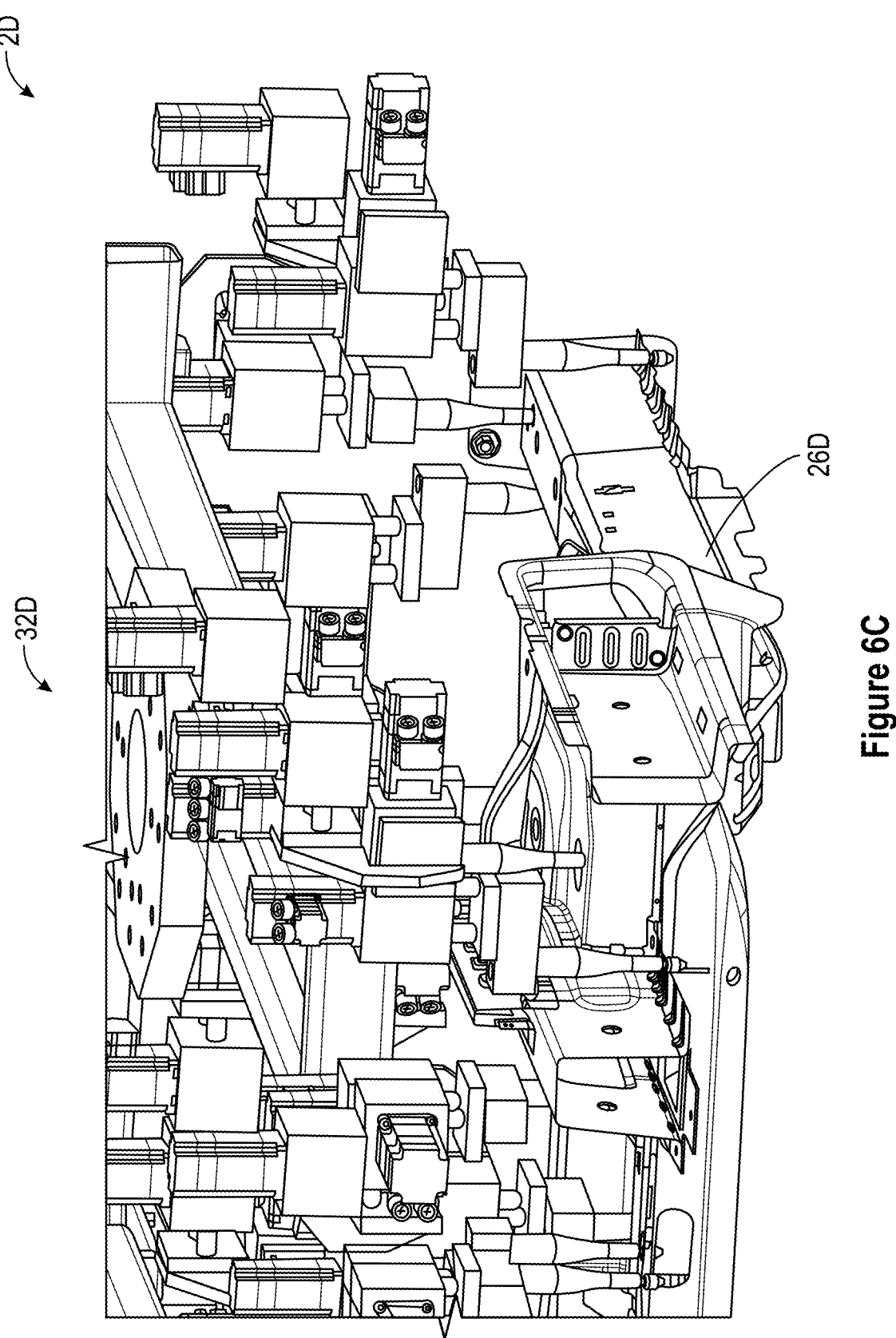
FIG. 6C is another perspective view of a portion of FIG. 6A.
Figure 6D:
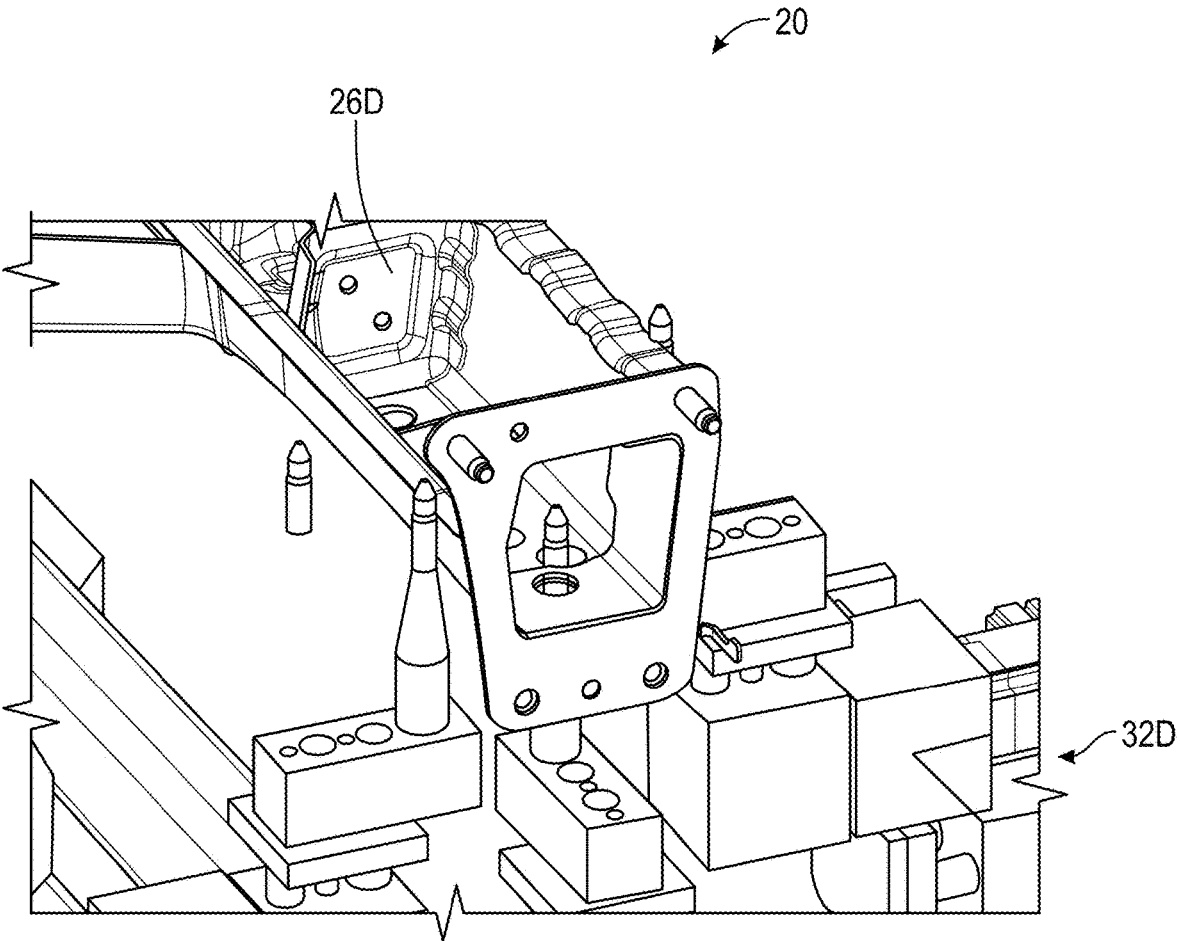
FIG. 6D is another perspective view of a portion of FIG. 6A.

FIG. 4 and FIG. 5 illustrate an exemplary material handling device 32 interacting with an exemplary part 26 of the exemplary subassembly 20. The material handling device 32 may comprise a number of gripping elements 50. The gripping elements 50 may be connected to one another through a framework of member 36. The gripping elements 50 may be configured to interact with various parts 26 of the subassembly 20. For example, without limitation, a given gripping element 50 may be placed within a locating aperture 19 on a part 26 of the subassembly 20. A second gripping element 50 and/or third gripping element 50 may be compressed against walls or other surfaces of the part 26 of the subassembly 20 to secure the part 26. In exemplary embodiments, the gripping elements 50 may be moved to various locations along the part 26 so as to provide a three-dimensional restraint against movement of the part 26. Edges of the part 26 may be located within the indent 54, though such is not required.

As illustrated with particular regard to FIG. 5, in exemplary embodiments a first protrusion 58A of a first gripping element 50A may be placed within a given locating aperture 19 of a given part 26 while a second protrusion 58B of a second gripping element 50B and a third protrusion 58C of a third gripping element 50C may be located on the walls of the part 26 on either side of the given locating aperture 19 to secure the part 26. The second and third protrusions 58B and 58C may compress the part 26 to secure the part 26 while the first protrusion 58A ensures accurate placement. The first protrusion 58A may be pushed out against one edge of the locating aperture 19 to help secure the part 26. Additional sets of gripping elements 50 may likewise be secured at other locating apertures 19 of the part 26. In this way, the part 26 may be secured so that the material handling robot 16 may move the material handling device 32, and thus the part 26.

FIG. 6A through FIG. 6D illustrates multiple material handling devices 32A-D interacting with multiple parts 26A-D to create the exemplary subassembly 20. While four material handling devices 32A-D and parts 26A-D are shown to create the exemplary subassembly 20, any number of material handling devices 32 and parts 26 are contemplated to form any kind of subassembly 20. Alternatively, a final assembly 20 may be formed. Each of the material handling devices 32 may be selectively mountable to the material handling robots 16. In this way, the various material handling robots 16 may handle a variety of material handling device 32. Each of the material handling devices 32 may likewise grip one or a number of different types of parts 26. In this way, many different types of parts 26 may be handled to create many different types of subassemblies 20 without the need to change hard point dedicated line tooling to change.

Figure 7:
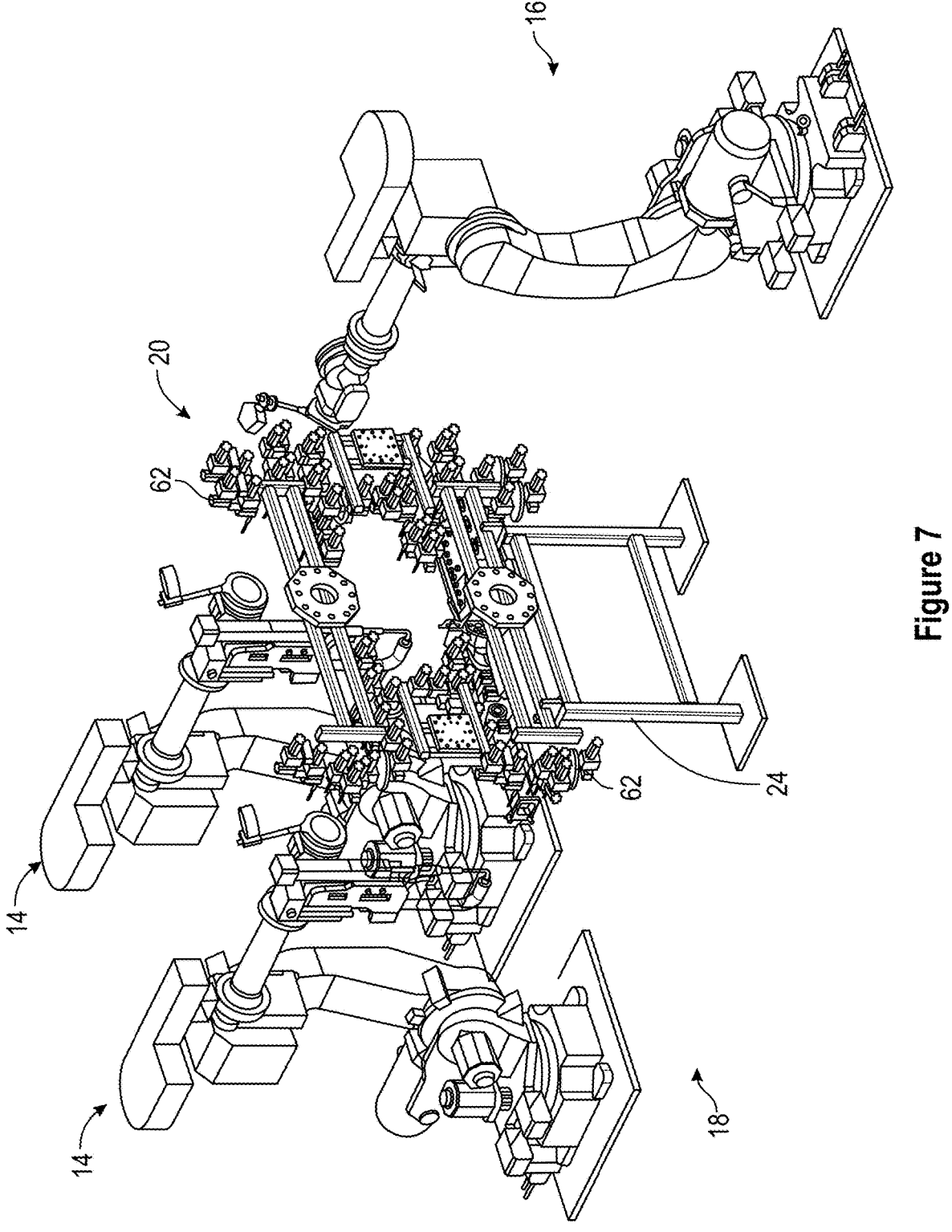
FIG. 7 is a perspective view of the system of FIG. 1 with certain material handling robots not illustrated so that the subassembly and material handling devices can be seen more clearly.

FIG. 7 illustrates an exemplary docking station 24. The docking station 24 may be configured for placement on the ground in the assembly area 18. Alternatively, or additionally, the docking station 24 may be secured to an AGV 28.

The docking station 24 may be configured to receive one or more parts 26 and/or material handling devices 32. In exemplary embodiments, a first material handling device 32 holding a first part 26 may be rested atop the docking station 24. Additional material handling devices 32, each with one or more parts 26, may be stacked or otherwise adjoined to the first material handling device 32 to create the subassembly 20. The material handling robots 16 may be configured to secure each of the material handling devices 32 at given positions within the assembly area 18. In other exemplary embodiments, once moved, the material handling devices 32 or parts 26 may rest in place such that the material handling devices 32 may be removed from the respective material handling robots 16. The use of the docking station 24 may assist with locating the subassembly 20. The docking station 24 may additionally, or alternatively, reduce the number of material handling robots 16 required. For example, without limitation, a single material handling robot 16 may be configured to grab and locate a number of material handling devices 32, each with one or more associated parts 26, and stack such parts 26 or material handling devices 32 on the docking station 24. It worth noting the docking station is optional and may not be used.

Figure 8:
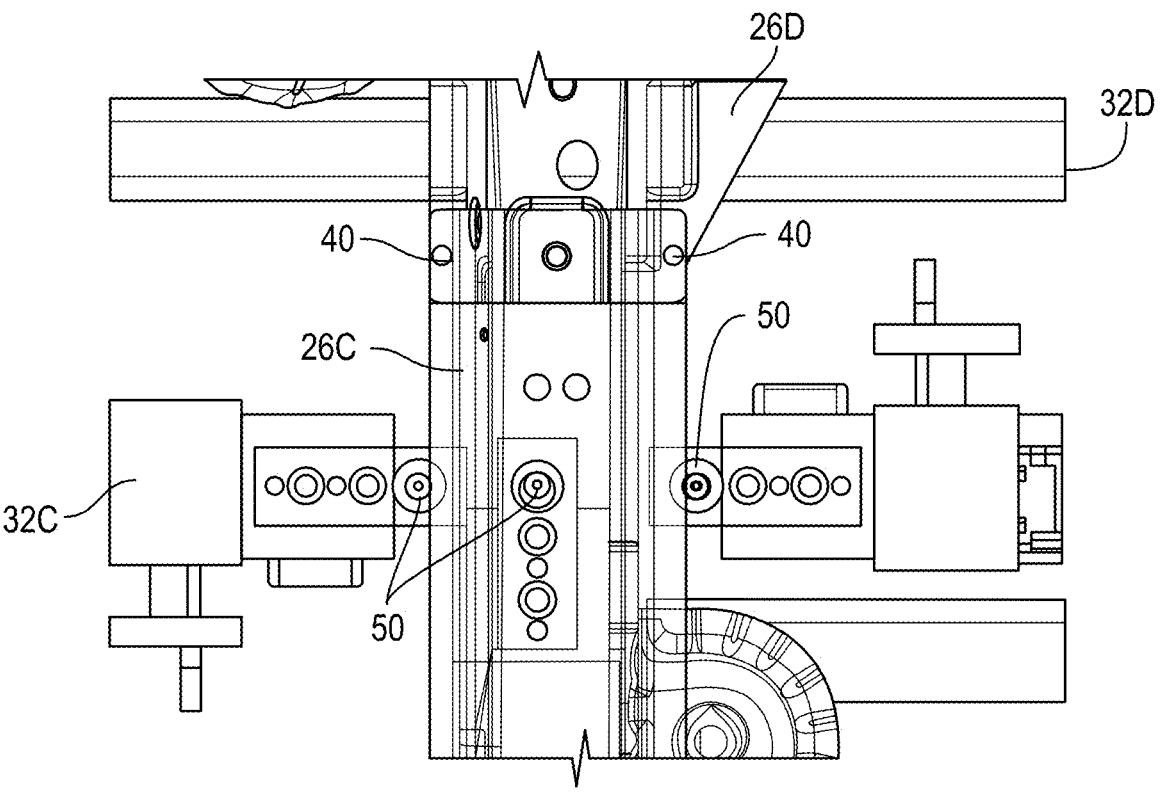
FIG. 8 is a detailed bottom view of detail B of FIG. 6A.

FIG. 8 illustrates exemplary datums 40. The datums 40 may be located at overlaps or adjoining areas between two parts 26D and 26C, though any number and location of datums 40 are contemplated. The datums 40 may be configured for recognition by the machine vision system 12. In exemplary embodiments, the datums 40 are ball shaped, though any type, shape, and size datums 40 are contemplated. Alternatively, or additionally, the datums 40 may comprise certain features of the parts 26 which are recognizable by the machine vision system 12.

Figure 9:
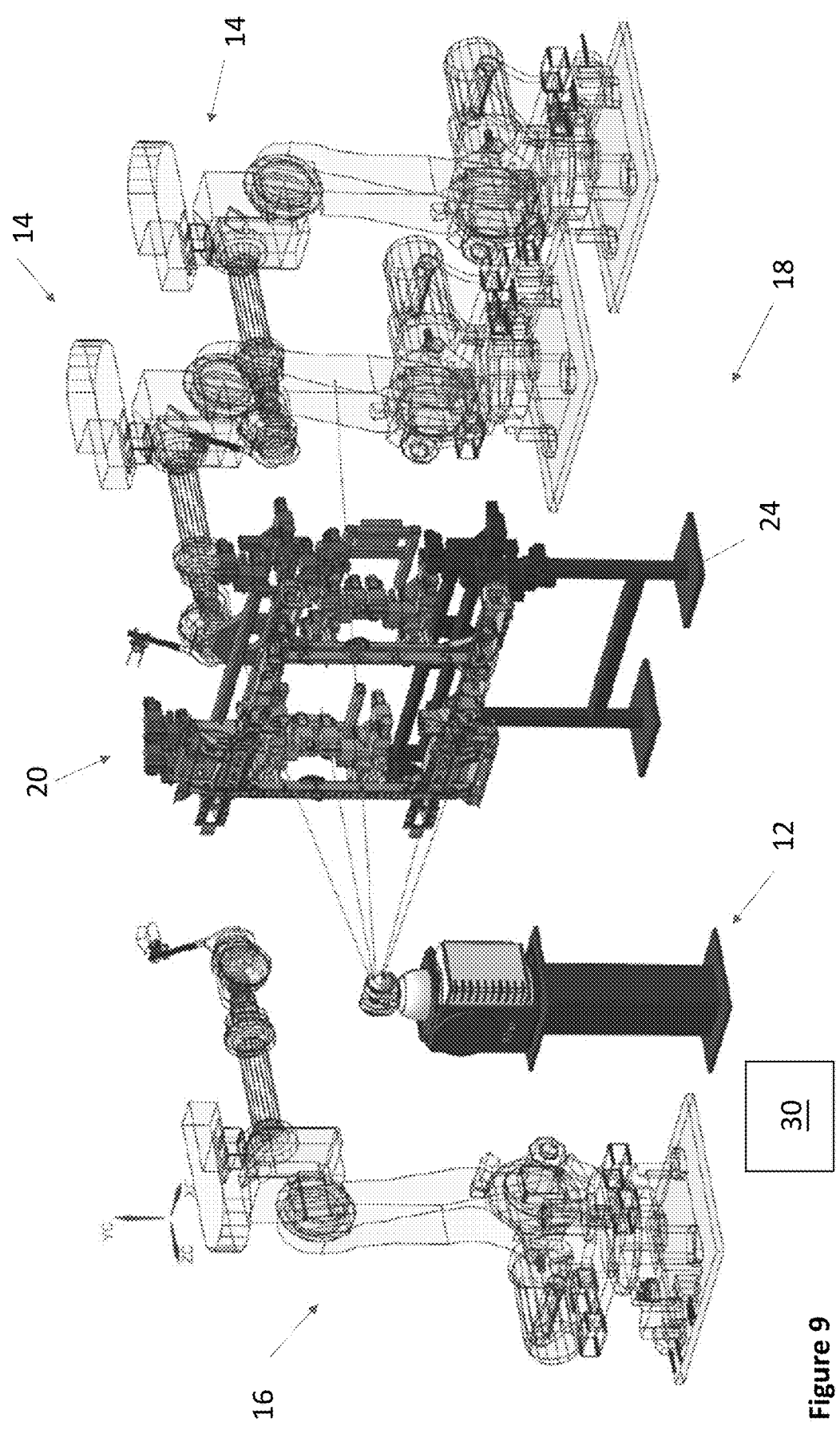
FIG. 9 is a perspective view of the AI driven reconfigurable manufacturing system of FIG. 7 also illustrating an exemplary machine vision system in use therewith.

FIG. 9 illustrates the machine vision system 12 locating the various datums 40. The machine vision system 12 may comprise executable software instructions stored on one or more electronic storage devices which when executed by one or more processors configure the machine vision system 12 to check for alignment of the various parts 26 of the subassembly 20. If further alignment is needed, the controller 30 may send appropriate instructions to the material handling robots 16. Another alignment scan may be performed to re-check alignment. When no further alignment is needed, the controller 30 may direct the joining robots 14 to begin joining the parts 26. The machine vision system 12 may transmit the location of the datums 40 from the last alignment scan to the controller 30 to instruct the joining robots 14. Alternatively, or additionally, such executable software instructions and related commands may be stored at the controller 30 and transmitted to the data store FIG. 12 for capability and trend analysis for example.

Figure 10:
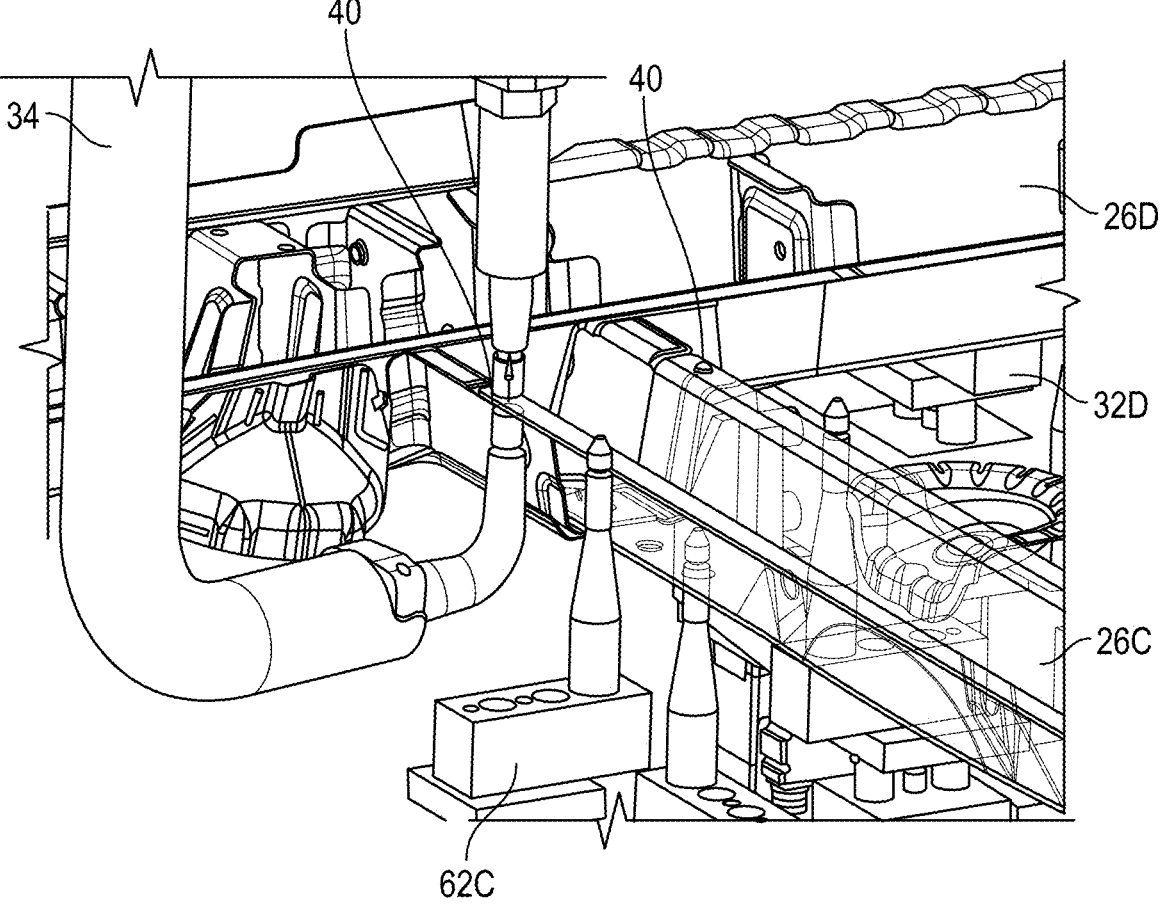
FIG. 10 is a detailed perspective view of FIG. 8 with a joining robot in use.

FIG. 10 illustrate the joining robots 14 beginning a weld. The joining robot 14 may be configured to begin a weld at a datum 40 and travel a specified distance in a specified direction, though such is not required. For example, without limitation, the joining robot 14 may be configured to instead begin a weld a specified distance in a specified direction from a datum 40. Any type of welding is contemplated such as, but not limited to, shielded metal arc welding, gas metal arc welding, flux cored arc welding, gas tungsten inert gas welding, some combination thereof, or the like. The weld may be made over a distance or spot welding may be provided. While welding is discussed, other forms of joining the parts 26 are contemplated such as, but not limited to, adhesion, fastening, riveting, crimping, brazing, soldering, shrink fitting, some combination thereof of the like and the joining robots 14 may be adapted for such purposes. Various joining device 34 may be utilized to perform such various types of joining. More than one type of joining may be performed.

Figure 11:
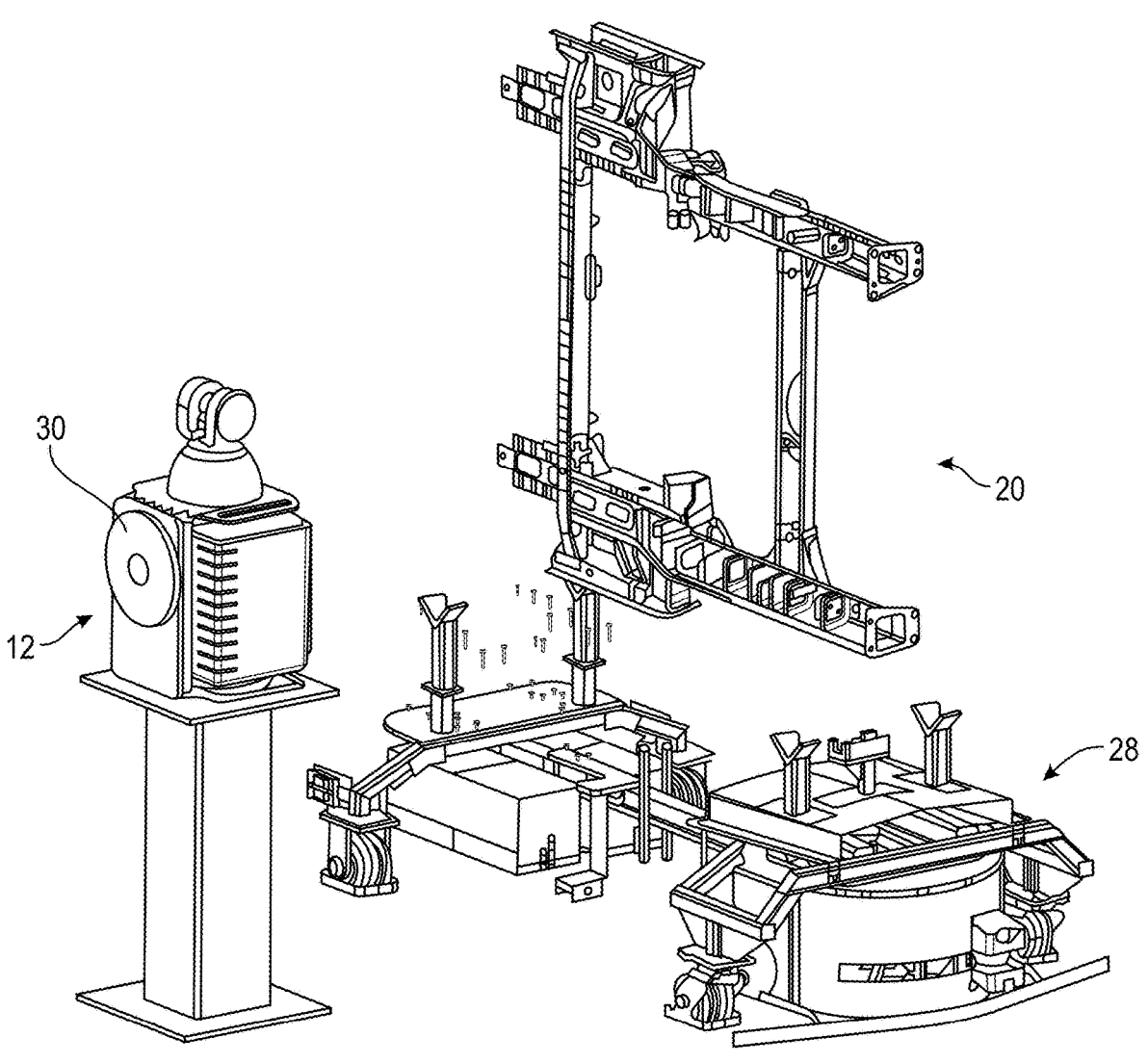
FIG. 11 is a perspective view of a completed subassembly undergoing an inspection scan and an exemplary AGV.

FIG. 11 illustrates an exemplary completed subassembly 20. Once the various parts 26 are joined, the various material handling device 32 may release their grip on the parts 26. The AGV can then move the subassembly to the next station in the process, until the assembly is done. The machine vision system 12 may perform an inspection scan of the completed subassembly 20. Any misalignment(s) may be reported to the controller 30. The subassembly 20 may be secured to an AGV 28 and removed from the assembly area 18, though any method of transportation is contemplated. Any size, shape, type, number, or the like of parts 26 are contemplated to form any size, shape, type, number, or the like subassembly 20.

Figure 12:
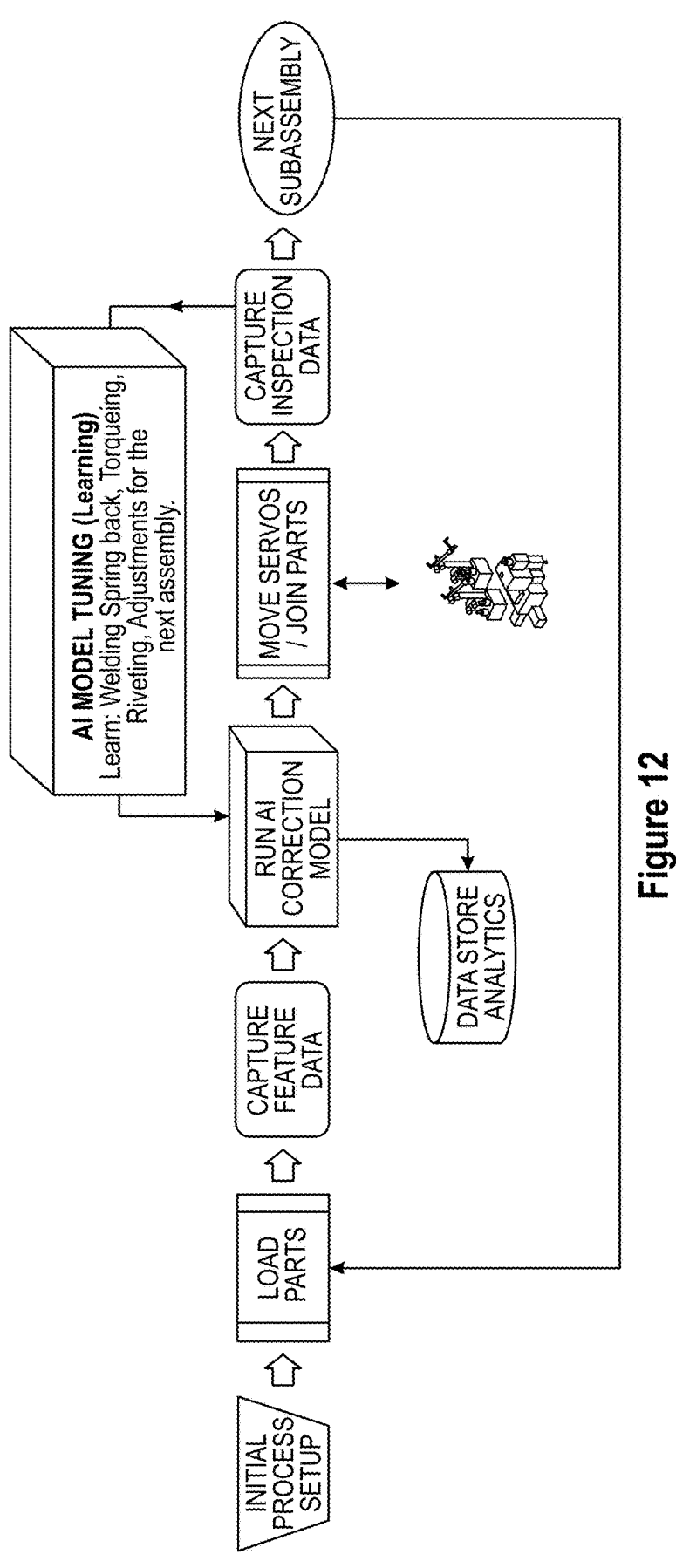
FIG. 12 is an exemplary flow diagram for the A.I. driven reconfigurable manufacturing process of the present invention.
Figure 13:
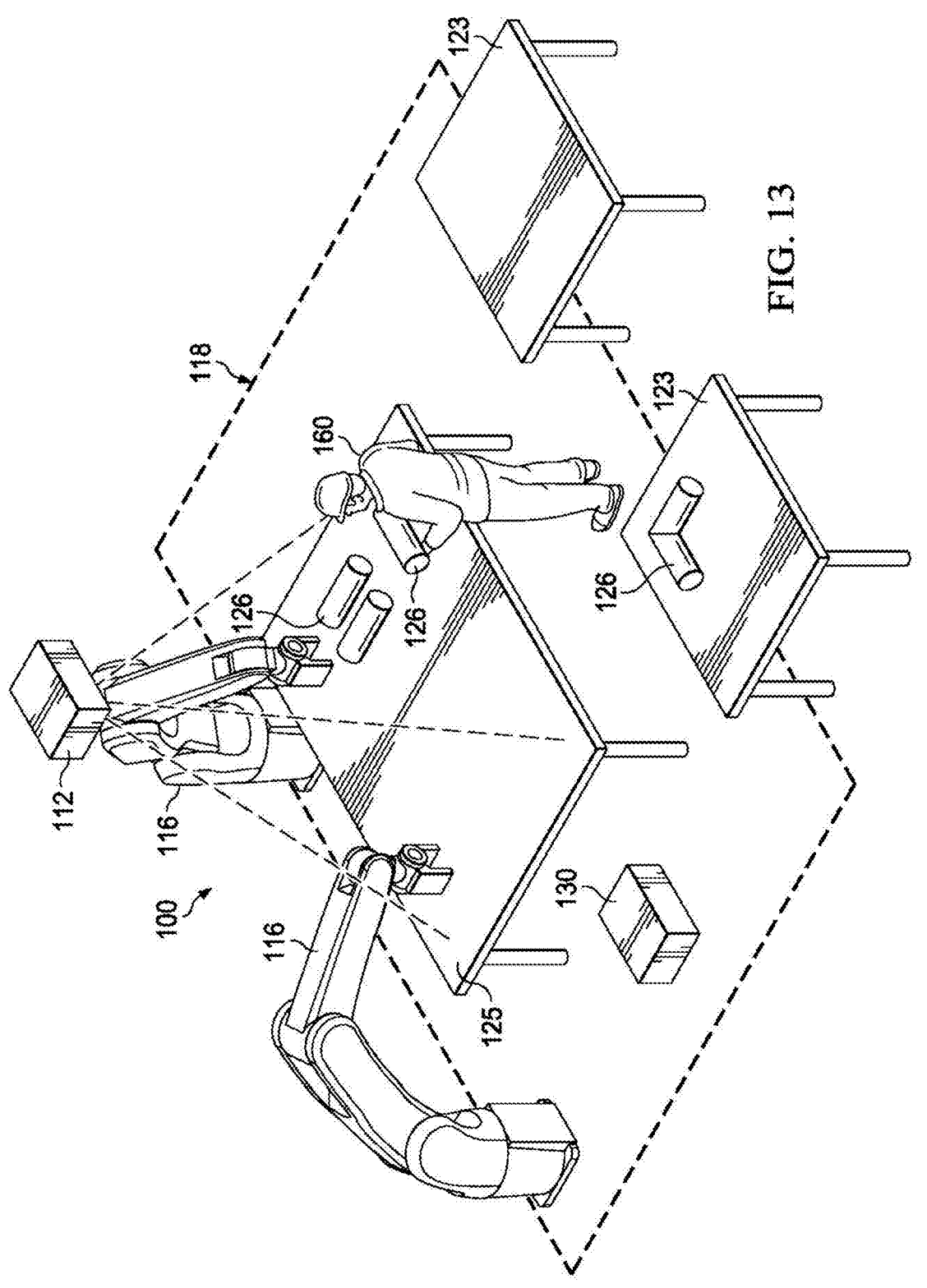
FIG. 13 is a perspective view of another exemplary AI driven reconfigurable manufacturing system of the present invention with A.I. learning.

FIG. 12 illustrates an exemplary flow diagram for the reconfigurable manufacturing system 10. The reconfigurable manufacturing system 10 may be configured to create any number of type of subassemblies 20 with only electronic reprogramming and minimal, if any, retooling or physical reconfiguration of the physical components. An initial set up process may be performed. The initial set up may include programming the AI algorithms with all virtual datums 40 for each subassembly 20 to be produced. This replaces the 3-2-1 traditional physical fixturing scheme. The initial set up may further comprise programming the controller 30 with commands configured to cause the material handling robots 16 and the material handling device 32 to secure and move the various parts 26, the machine vision system 12 to perform inspection, alignment, and/or identification scans, such as to determine the location of the datums 40, and the joining robots 14 to join the parts 26. The necessary parts 26 to create one or more subassemblies 20 may be provided. Preferably, such parts 26 are loaded in the one or more bins 22.

Each of the parts 26 may be subjected to an inspection scan to determine which part to grasp and/or verify that the correct part 26 has been grasped. Each part 26 may be subjected to an alignment scan such that the location of the datums 40 may be determined. The machine vision system 12 may transmit the location of such datums 40 to the controller 30. The controller 30 may compare the location of the scanned datums 40 with predetermined locations of virtual datums 40 to determine a best fit for the parts 26 to create the subassembly 20 stored at the learning A.I. software. The controller 30 may transmit instructions to the various material handling robots 16 and/or material handling devices 32 to place the parts into a best fit assembly position. Once the parts 26 are assembled into the subassembly 20, the machine vision system 12 may perform an alignment scan to capture the various datums 40 and verify that the proper positioning has been achieved. The parts 26 may be realigned as needed and subsequent alignment scans may be performed as needed. A correction model (learning AI algorithm) may optionally be run to compensate for lessons learned during creation of any prior subassemblies 20 including weld distortions, over torqueing and others. The material handling robots 16 may realign the parts 26 as required.

The joining robots 14 may join the parts 26 to create the subassembly 20. The material handling device 32 may be removed and the machine vision system 12 may perform an inspection scan the now joined subassembly 20. The learning A.I. software may execute a learning model. The learning model may compare the location of the datums 40 from the inspection scan against the expected position of the datums 40. The expected position of the datums 40 may be provided by the prior alignment scan(s), the stored virtual datums 40 for the subassembly 20, and/or inspection scans of previous subassemblies 20. The learning model may be configured to compensate for any differences by updating the virtual datums 40 to compensate for such differences. Such differences may arise from, for example without limitation, weld spring back, gravity, deflection, compliance, torqueing, riveting, some combination thereof, or the like. Such corrections may be performed by machine learning A.I. software. The process for determining the best fit, providing spatial adjustment, and compensating for differences may be as shown and described in U.S. Pat. No.

10,095,214 issued Oct. 9, 2018 and U.S. Pat. No. 10,101,725 issued Oct. 16, 2018, which are hereby incorporated by reference. The next subassembly 20 may begin production by repeating one or more of the aforementioned steps. The leaning model and/or the database may be located at the controller 30, though such is not required.

FIG. 13 through FIG. 18 illustrate another exemplary embodiment of the system 100 and related methods for operating the same. Similar elements may be numbered similarly but increased by 100 (e.g., 16 to 116). As shown with particular regard to FIG. 13, a worker 160 or other use may gather one or more parts 126 from various part storage tables 123 located within or adjacent to the assembly area 118. Alternatively, or additionally, such parts 126 may be gathered from bins 22. The worker 160 may carry one or more parts 126 in the assembly area 118. In other exemplary embodiments, such parts 126 may be picked up by material handling robots 116. Any number and type of parts 126 are contemplated to form any number or type of subassemblies 120.

The gathered parts 126 may be placed on a table 125, pallet or conveyor. The table 125 may be located near a center of the assembly area 118, though any location within the assembly area 18 is contemplated. Alternatively, or additionally, the parts 126 may be placed at the docking station 24. The assembly area 118 may be in view of a machine vision system 112. The machine vision system 112 may comprise one or more cameras, lasers, radar, proximity detectors, ultrasonic, photo eyes, some combination thereof, or the like. Any location, number, orientation, arrangement, and the like of components of the machine vision system 112 is contemplated.

A safety scanner mounted at the bottom of the table or another location in the cell may be configured to detect any workers 160 or other individuals in the assembly area 118. If a worker 160 or other person is in the assembly are 118, a controller 130 may be configured to prevent machine handling robots 116 from moving or halt the movement of any machine handling robots 116 in motion.

Figure 14:
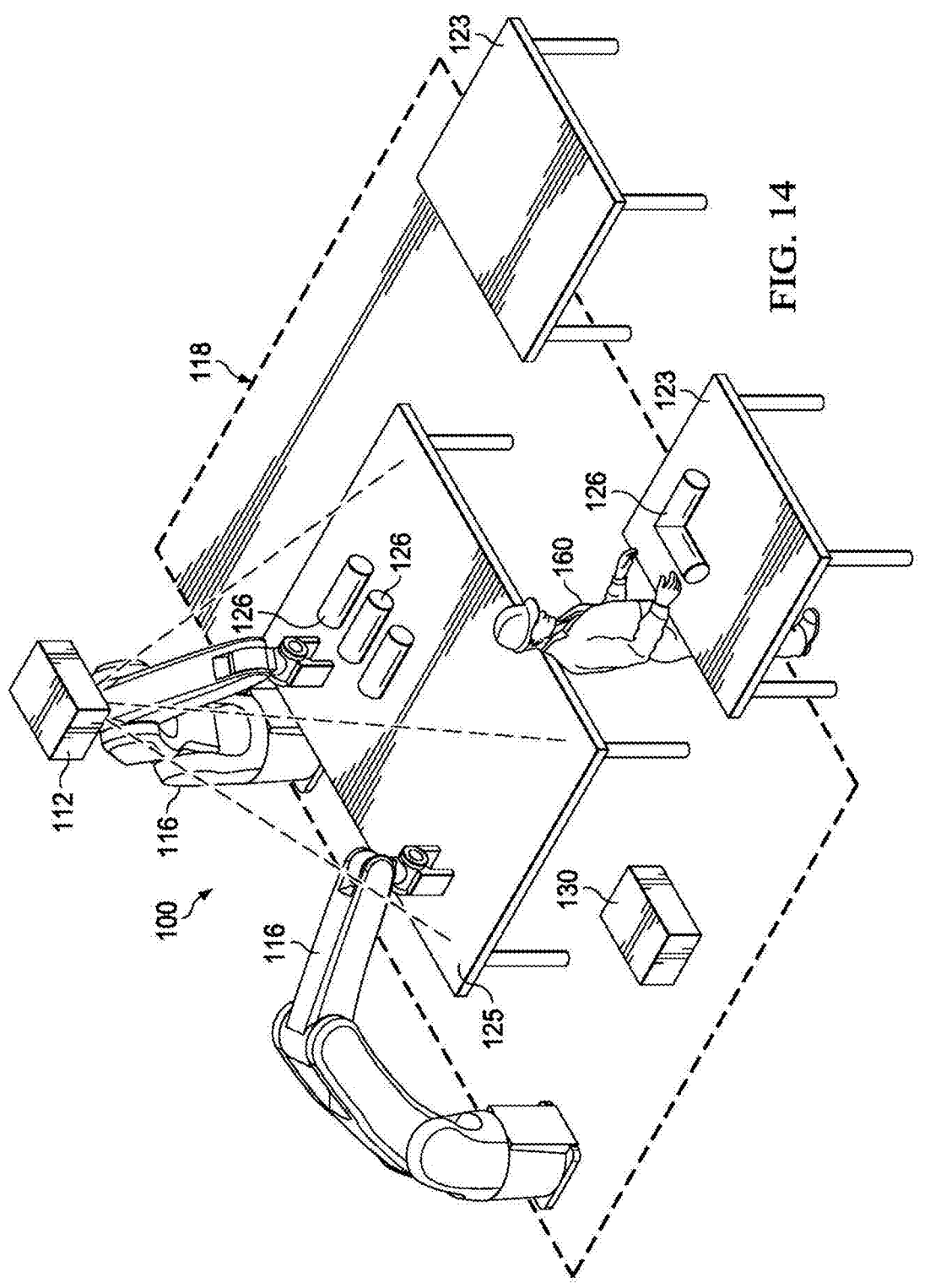
FIG. 14 is another perspective view of the system of FIG. 13.
Figure 15:
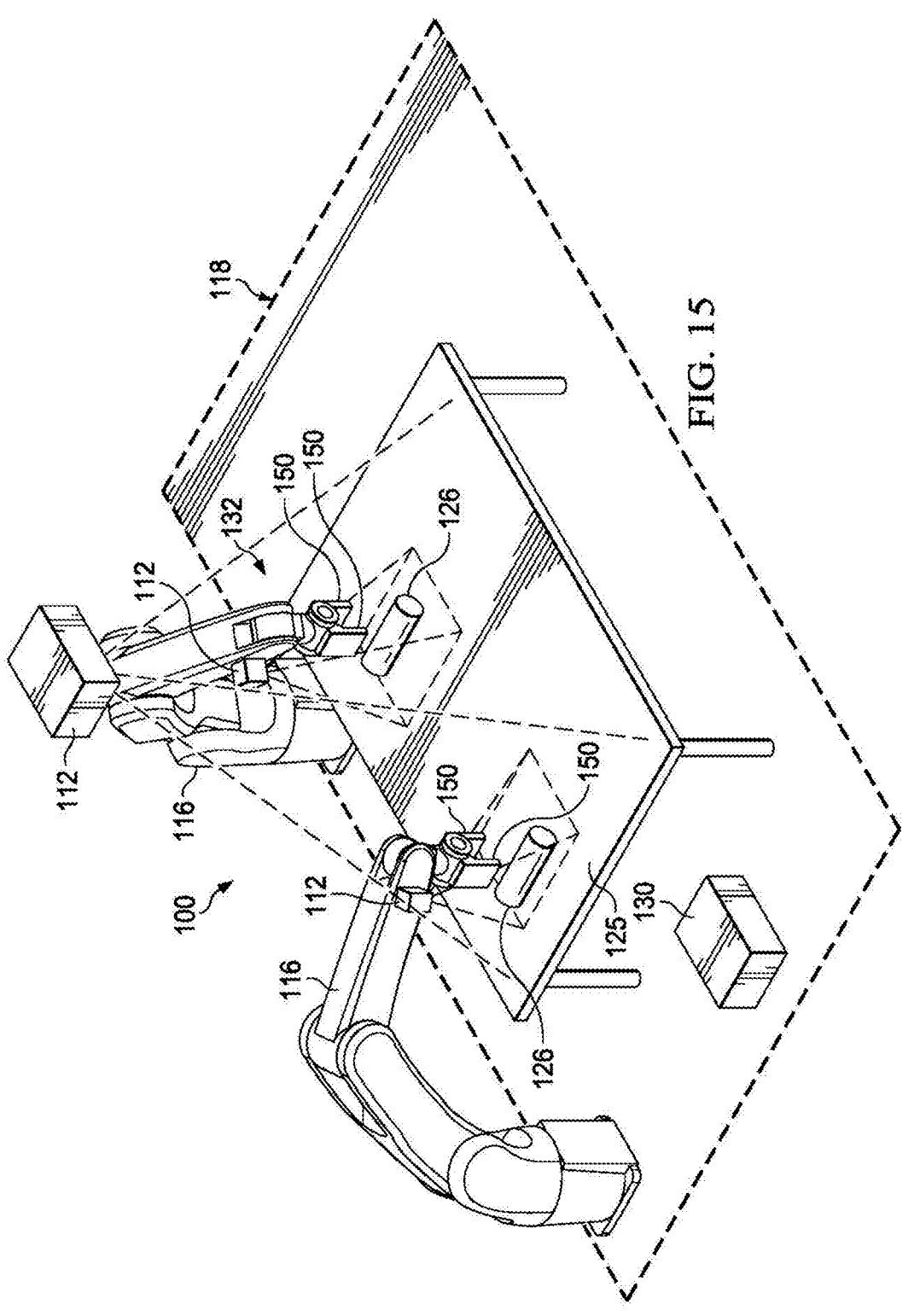
FIG. 15 is a detailed perspective view of the system of FIG. 13.

As shown with particular regard to FIG. 14, once the assembly area 118 is clear of workers 160 or other individuals, the controller 130 may signal the material handling robots 116 to begin or continue working. As shown with particular regard to FIG. 15, each of the material handling robots 116 may comprise a component of the machine vision system 112 which may be configured to perform an identification scan to identify and/or locate the parts 126 on the table for handling. In this way, the controller 130 may determine if the correct part 126 is being picked up as well as the location of such parts 126.

In exemplary embodiments, the component of the machine vision system 112 may be mounted to a material handling portion 132 of the material handling robot 116, though any number and location of components for the machine vision system 112 are contemplated. The various parts 126 may be grasped by the material handling portions 132 attached to the material handling robots 116. The material handling portions 132 may comprise claws, grippers, one or more gripping elements 150, vacuum systems, suction cups, some combination thereof, or the like. Any kind or type of material handling portion 132 configured to handle any shape or type of part 126 is contemplated. Each of the material handling portions 132 may be configured to handle a number of differently shaped parts 126.

Figure 16:
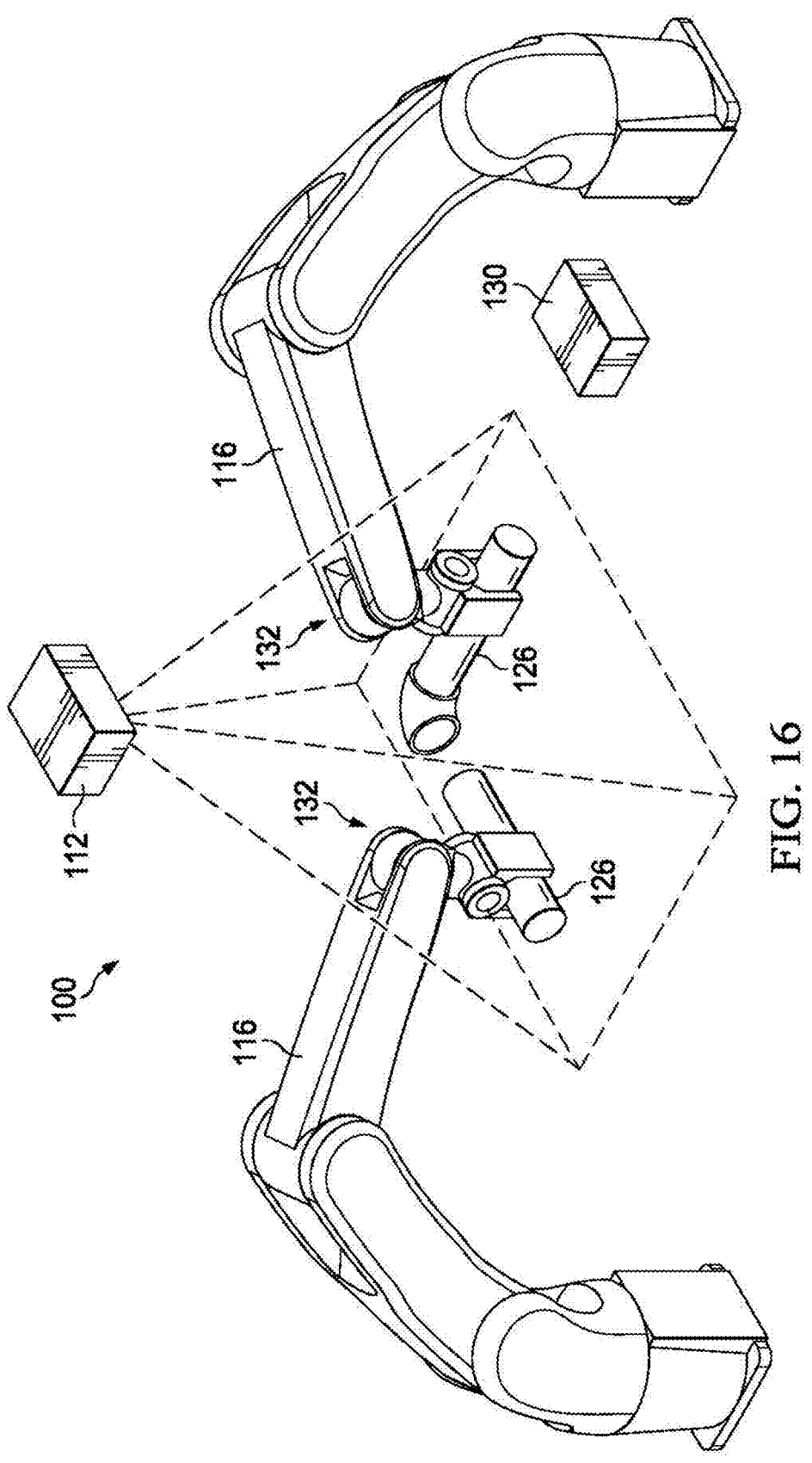
FIG. 16 another detailed perspective view of the system of FIG. 13.

As shown with particular regard to FIG. 16, each of the material handling robots 116 may move each of the parts 126 within view of the same or another component of the machine vision system 112, which may be configured to perform a first or additional identification scan to identify and/or locate the parts 126 within the assembly area 118. The parts 126 may be moved into an inspection position as needed.

The machine vision system 112 may be configured to perform an alignment scan. The alignment scan may confirm the location of the parts 126 within the assembly area 118. The identification and/or alignment scans may be made of various datums 140 on the parts 126. The datums 140 may be recognizable features of the parts 126. Such features may include, for example without limitation, apertures, edges, curved surfaces, protrusions, depressions, some combination thereof, or the like. The position of the datums 140 may be compared against stored, virtual datums 140 at the learning A.I. software of the controller 130. The learning A.I. software of the controller may utilize machine learning A.I. software to determine the best fit for the parts 126 to create the subassembly 120. The position of the parts 126 may be adjusted as needed to match the virtual datums 140. As shown in FIG. 16, the actual position of the parts 126 may be slightly different that the desired position for assembly and inspection. The ghosted image of the parts 126 in FIG. 16 may indicate an exemplary position of the parts 126 in accordance with the virtual datums 140.

Figure 17:
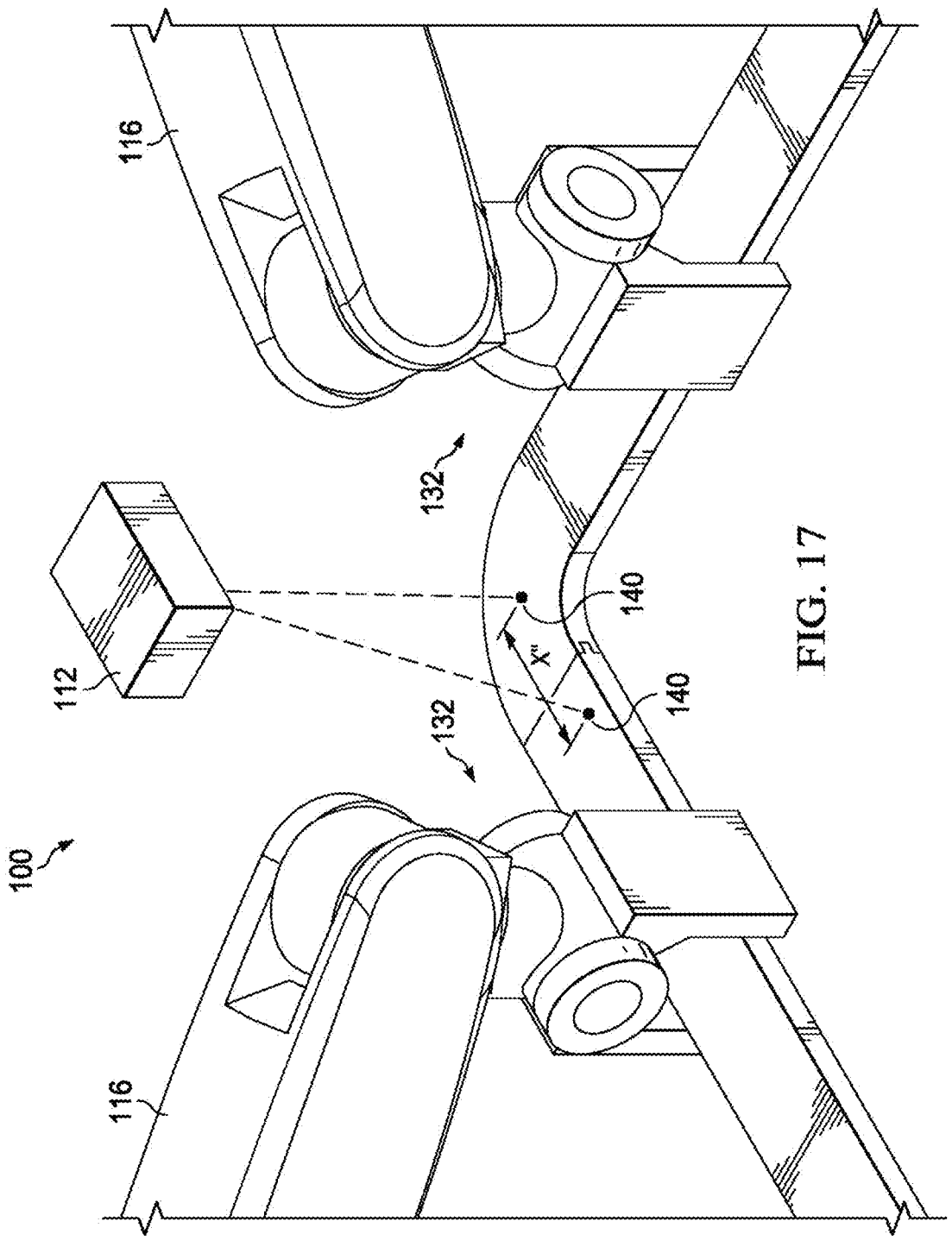
FIG. 17 another detailed perspective view of the system of FIG. 13.
Figure 18:
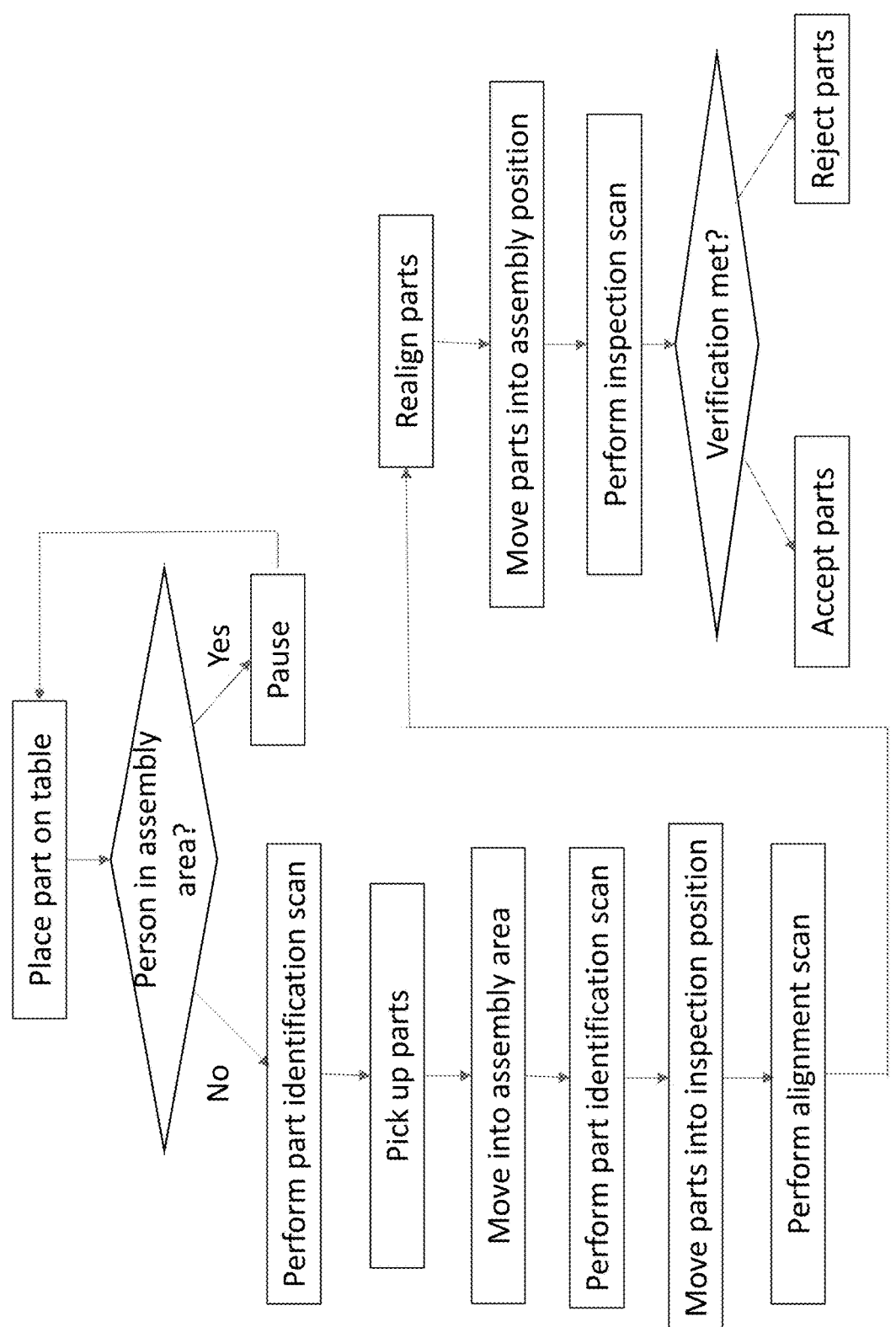
FIG. 18 is a flowchart with exemplary logic for operating the system of FIG. 13 in accordance with the present invention.

As shown with particular regard to FIG. 17, the material handling robots 116 may move the parts 126 into an assembly position to form a subassembly 120. The machine vision system 112 may perform an inspection scan of the subassembly. The inspection scan may be made of the various datums 140 on the parts 126. The location, number, and type of datums 140 illustrated in FIG. 17 is merely exemplary and is not intended to be limiting. Any number, type, and location of datums 140 for performing any kind of inspection scan and related measurements or determinations is contemplated. The controller 130 may be configured to determine if the location of the datums 140 in the inspection scan matches the virtual datums 140. If a match is made, or is within a predetermined margin of error, the parts may be accepted. If a match is not made, or the results are outside of a predetermined margin of error, the parts may be rejected. If a part is accepted, it may be joined. The process for determining the best fit and providing spatial adjustment may be as shown and described in U.S. Pat. No. 10,095,214 issued Oct. 9, 2018 and U.S. Pat. No. 10,101,725 issued Oct. 16, 2018, which are hereby incorporated by reference. If the part is rejected, the discrepancies may be transmitted to a learning module which may utilize the learning A.I. software to compensate for such discrepancies by adjusting the location for the virtual datums 140 for the subassemblies 120. The use of material handling robots 116 and material handling devices 132 to secure the parts 126 may provide a fixtureless assembly process. By storing the virtual datums 140, the need for a physical fixture to provide physical datum points may be eliminated.

In exemplary embodiments, all tasks may be sequenced using Common Object Request Broker Architecture (CO-BRA) to interact with COBRA actions, though any type or kind of programming language is contemplated. While subassemblies are discussed, it is contemplated that such subassemblies may be final assemblies as well.

Figure 19:
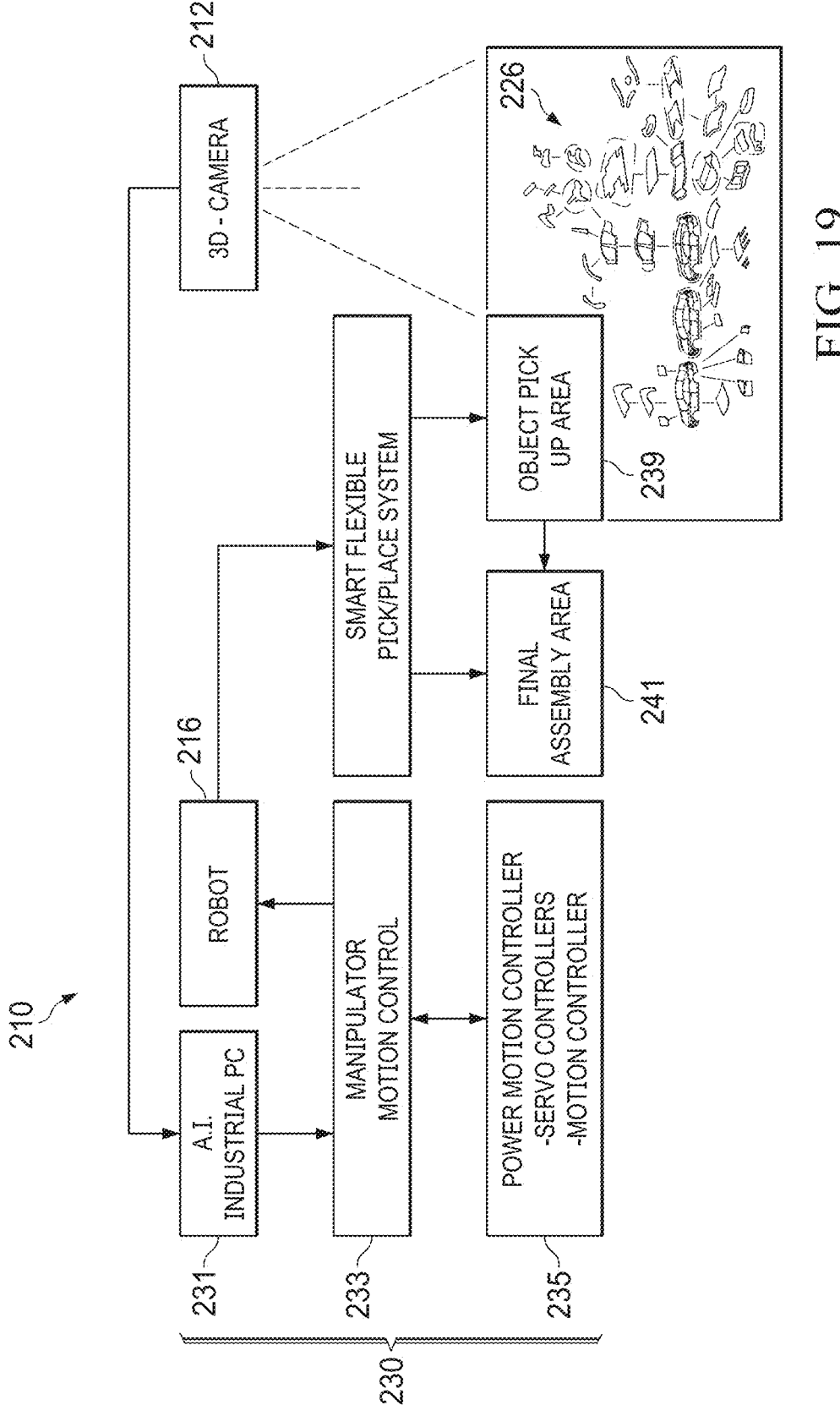
FIG. 19 is a simplified system diagram for an exemplary pickup and placement system in accordance with the present invention.

FIG. 19 illustrates an exemplary system 210 for pickup up and placement of parts 236 to form assemblies or subassemblies 220. The same or similar components may be numbered similarly but increased by multiples of 100 (e.g., 12 to 120, 220, etc.). The pickup and placement system 210 may comprise a controller 230. The controller 230 may comprise one or more subcomponents, engines, routines, algorithms, electronic storage devices, processors, combinations thereof, or the like including but not limited to, a learning software module 231, a manipulator motion control engine 233, and/or a power motion controller 235. The system 210 may be comprise one or more materials handling robots 216 and/or machine vision systems 212. The system 210 may be configured to cause said materials handling robots 216 to move one or more parts 236 from a first location 239 to a second location 241, such as but not limited to, to form one or more assemblies or subassemblies 220. The machine vision system 212 may comprise one or more cameras, lasers, range finders, proximity sensors, combinations thereof, or the like located at one or more central locations and/or at each materials handling robot 216. The machine vision system 212 may further comprise machine vision software.

Figure 20:
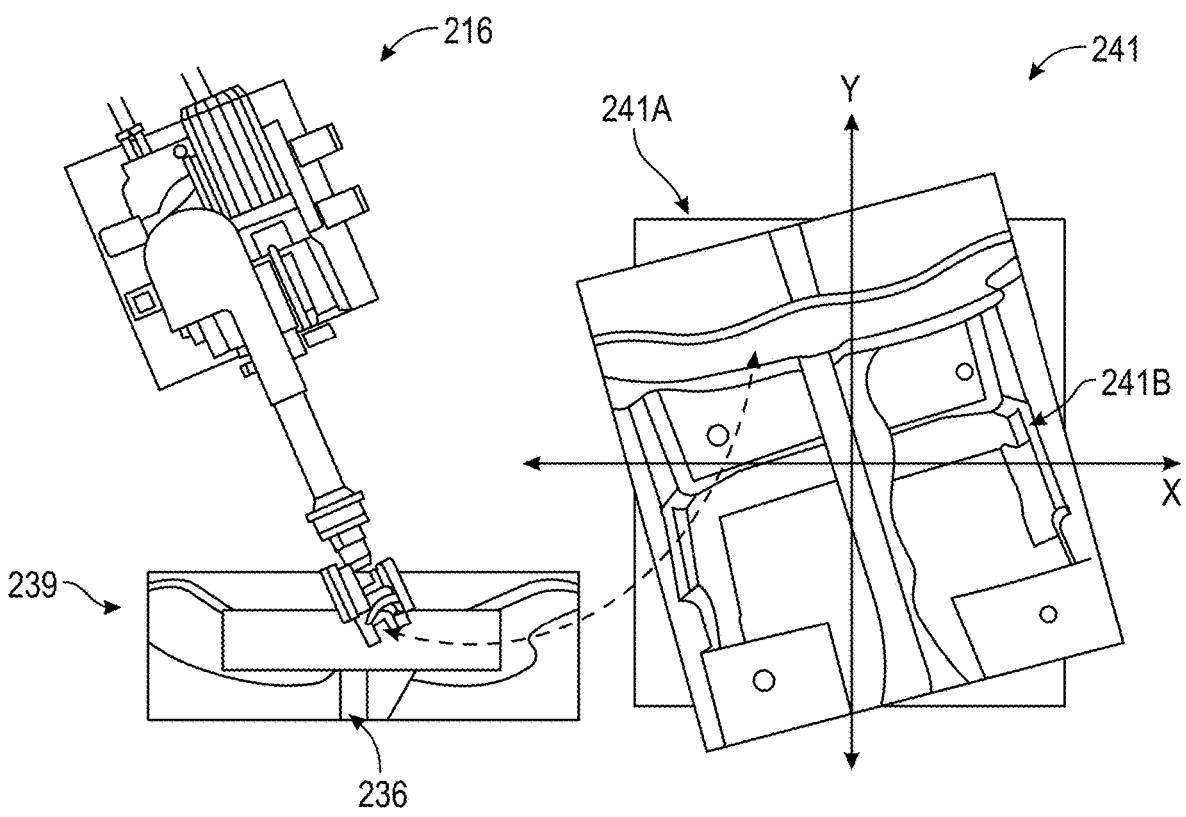
FIG. 20 is a top view of exemplary components of the system of FIG. 19.

FIG. 20 illustrates an exemplary such material handling robot 216 moving an exemplary workpiece 236 from an exemplary first location 239 to an exemplary second location 241. Upon placement at the second location 241, the machine vision system 212 may determine that the workpiece's 236 actual position 241B varies from an idea position 241A as illustrated.

Figure 21:
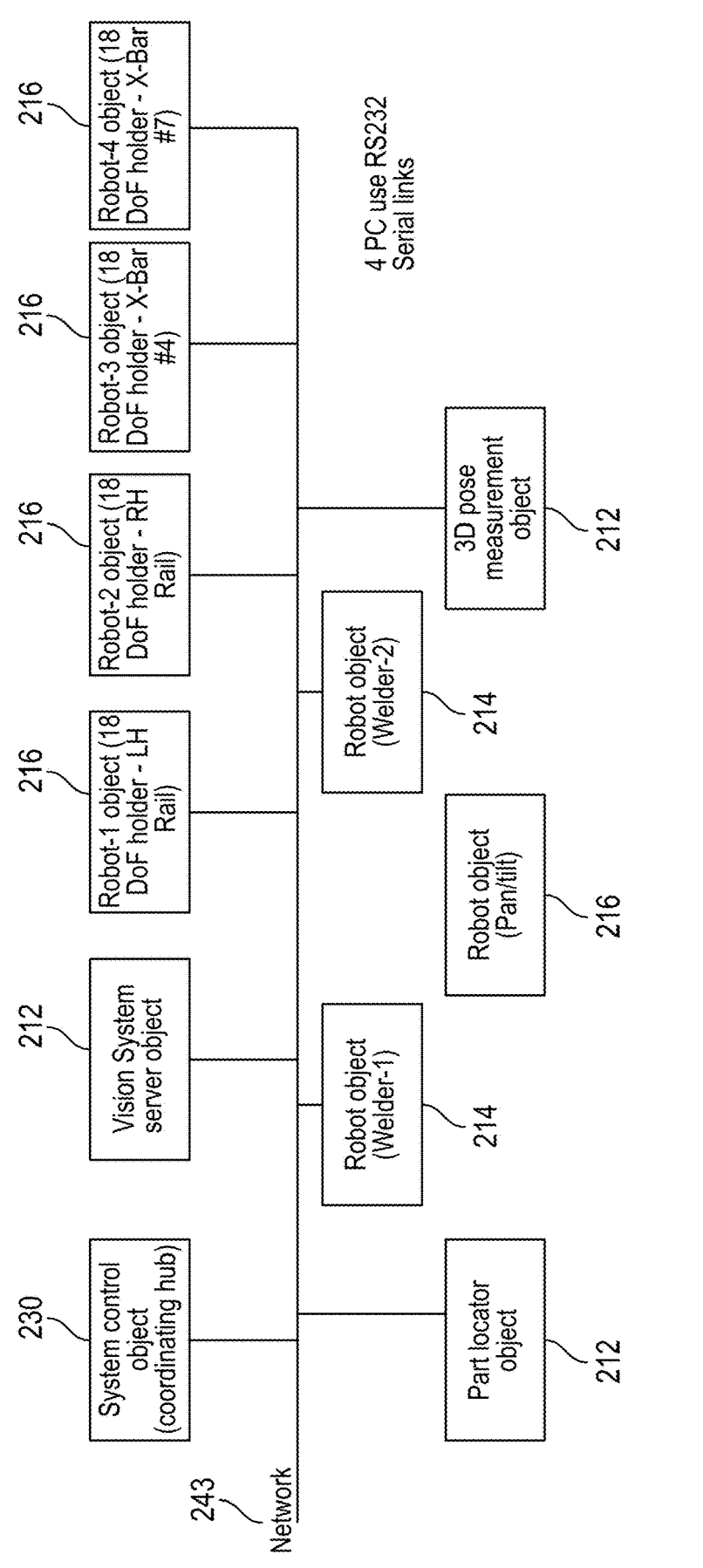
FIG. 21 is a simplified system diagram for the system of FIG. 19 within an exemplary manufacturing facility.

FIG. 21 illustrates that multiple materials handling robots 216 and/or joining robots 214 or other types of robots may be placed in electronic communication with one another and/or the controller 230 by way of a network 243. In other exemplary embodiments, only certain ones of the materials handling robots 216 and/or joining robots 214 or other types of robots may be placed in electronic communication with the controller 230 to form the system 210. The system 210 may, alternatively or additionally, comprise multiple machine vision systems 212 or controller 230 linked by one or more networks 243.

Figure 22:
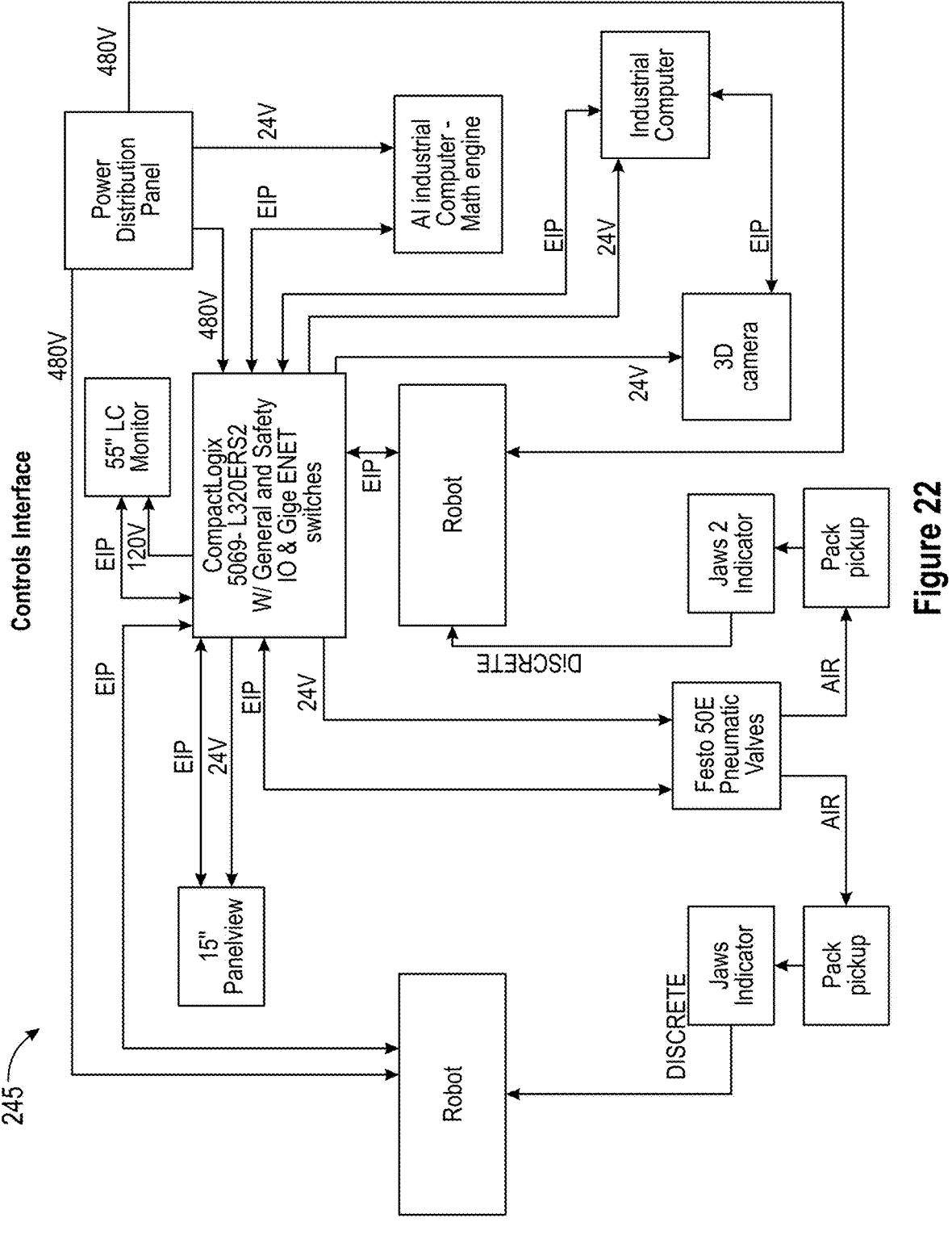
FIG. 22 is a more detailed system diagram for the system of FIG. 21.
Figures 23A, 23B, 23C, 23D, 23E, 23F:
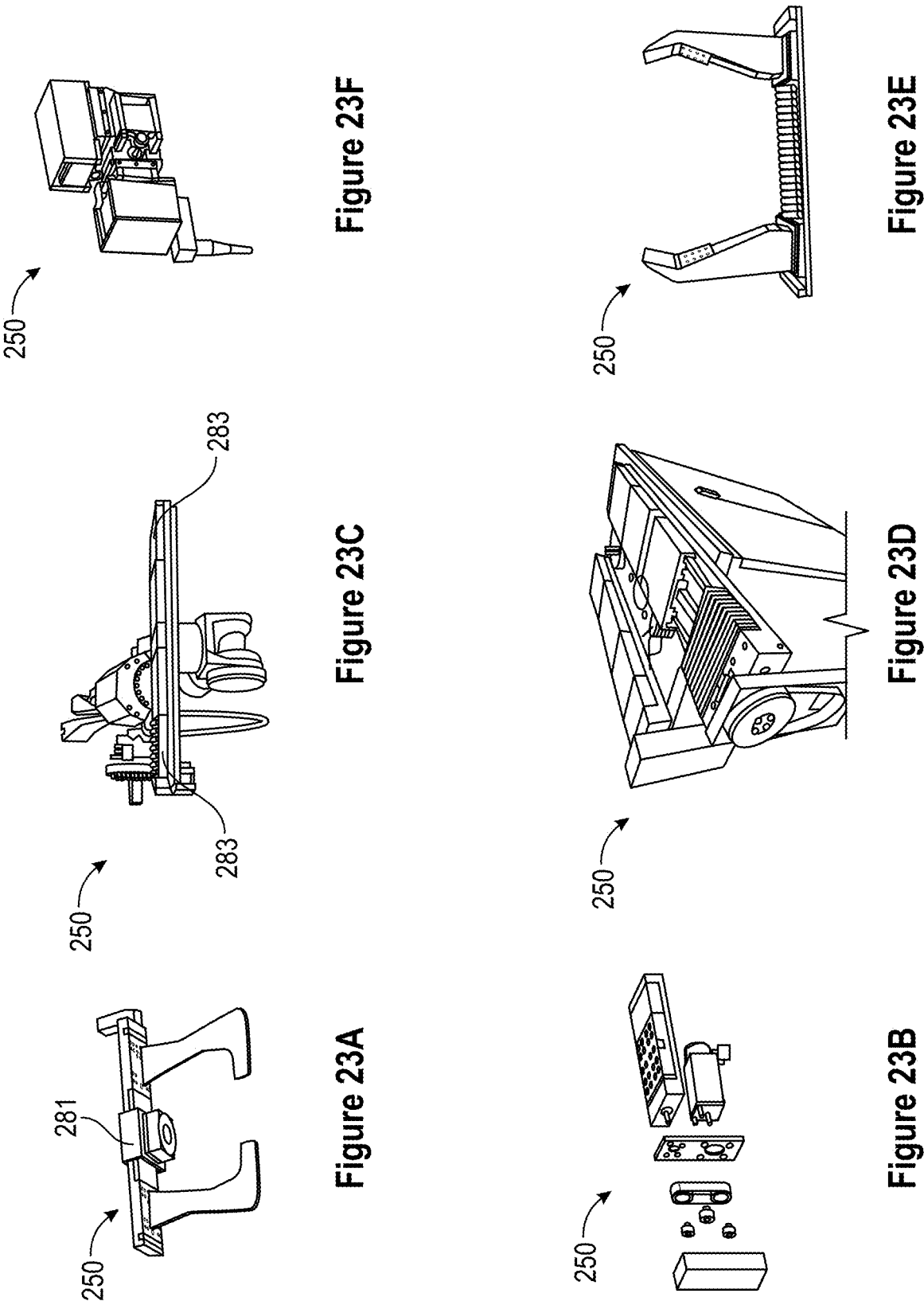
FIG. 23A is an exemplary materials handling portion of an exemplary materials handling robot for use with the system of FIG. 19.
FIG. 23B is an exemplary materials handling portion of an exemplary materials handling robot for use with the system of FIG. 19.
FIG. 23C is an exemplary materials handling portion of an exemplary materials handling robot for use with the system of FIG. 19.
FIG. 23D is an exemplary materials handling portion of an exemplary materials handling robot for use with the system of FIG. 19.
FIG. 23E is an exemplary materials handling portion of an exemplary materials handling robot for use with the system of FIG. 19.
FIG. 23F is an exemplary materials handling portion of an exemplary materials handling robot for use with the system of FIG. 19.

FIG. 22 illustrates an exemplary controls interface 245 for the system 210.

FIG. 23A through FIG. 23F illustrate various exemplary gripping elements 250 and/or components for the same for use with the materials handling robots 216. Such gripping elements 250 may, alternatively or additionally, be utilized as, or in conjunction with, docking devices 224 for the subassembly or assembly 220. Compliance devices 281, the purpose of which will be explained in greater detail herein, may be utilized in connection with the gripping elements 250. Bellows or other expansion members 283 may be utilized to adjust the size of the gripping elements 250. Any size or type of gripping element 250 may be utilized including but not limited to, jaws and/or pins. Each gripping element 250 may comprise one or more motors, such as servo motors.

Figure 24:
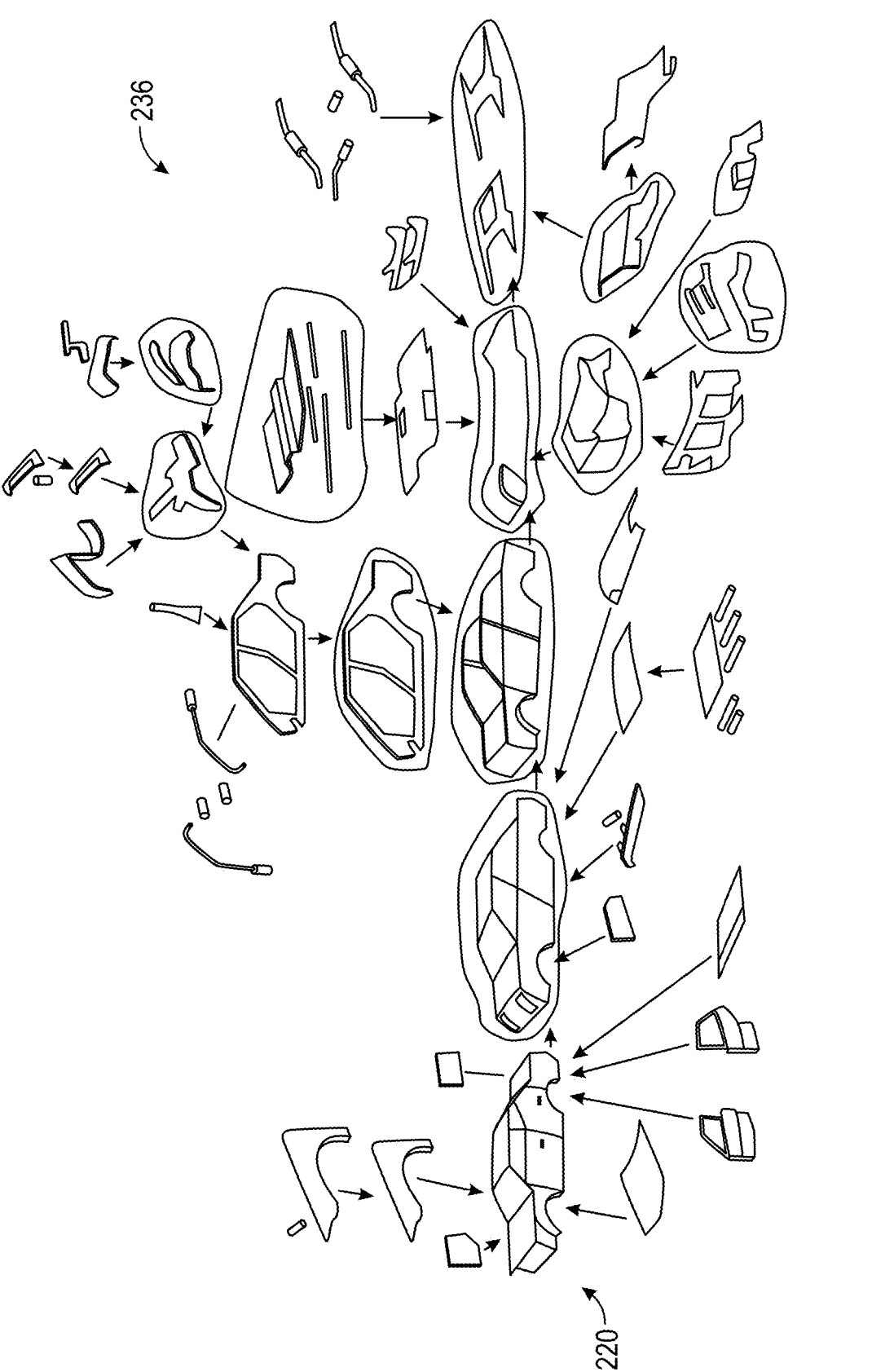
FIG. 24 is a plan view of exemplary parts, subassemblies, and assemblies for use with the system of FIG. 19.
Figure 25:
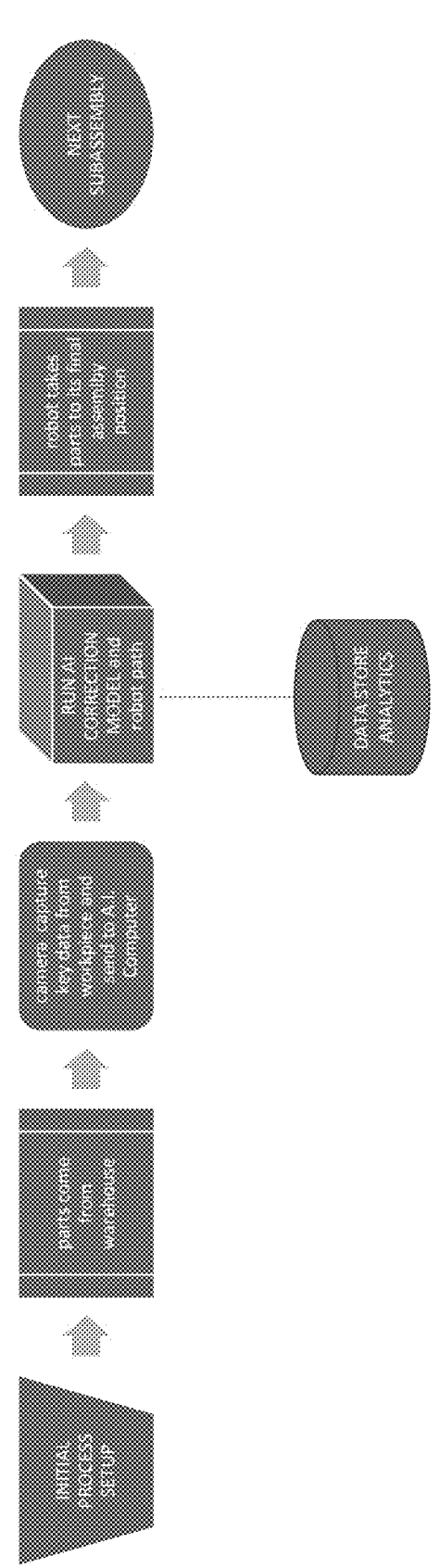
FIG. 25 is a flowchart with exemplary logic for use with the system of FIG. 19.
Figure 27B:
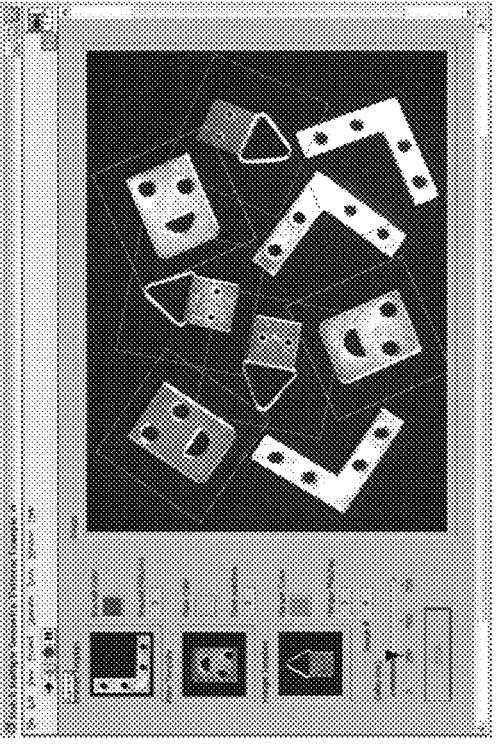
FIG. 27B is an exemplary machine vision view of exemplary parts for use with the system of FIG. 19.
Figure 27A:
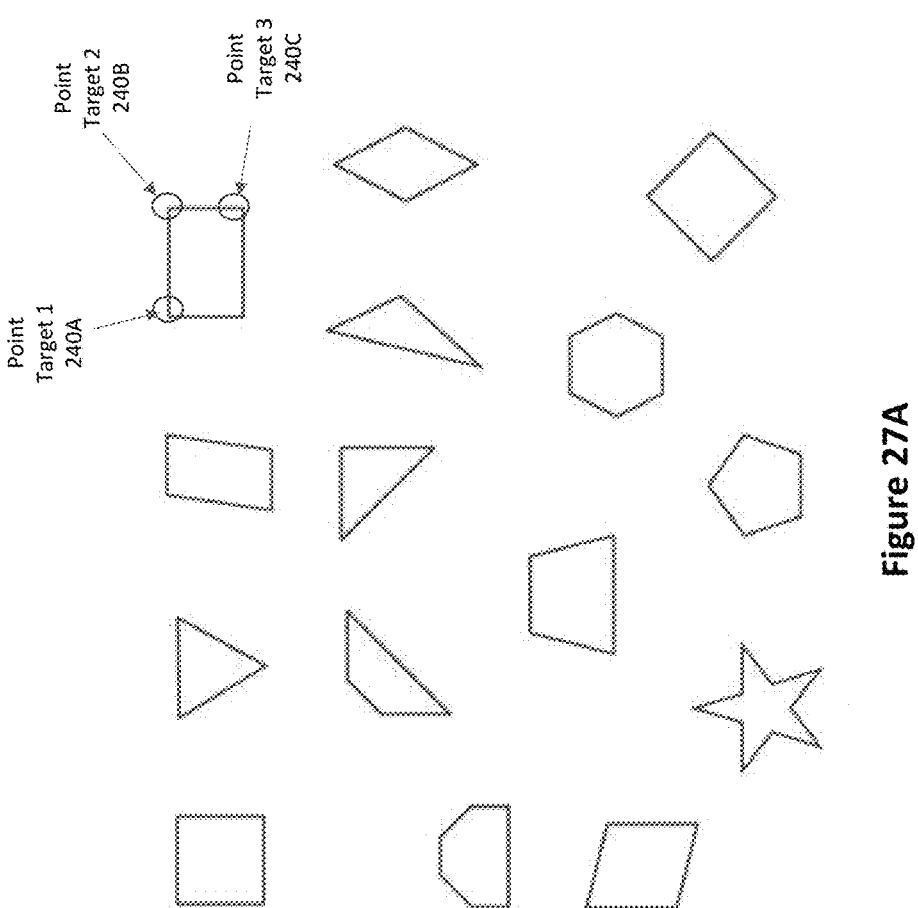
FIG. 27A is a plan view of exemplary parts with exemplary target points for use with the system of FIG. 19.
Figure 28B:
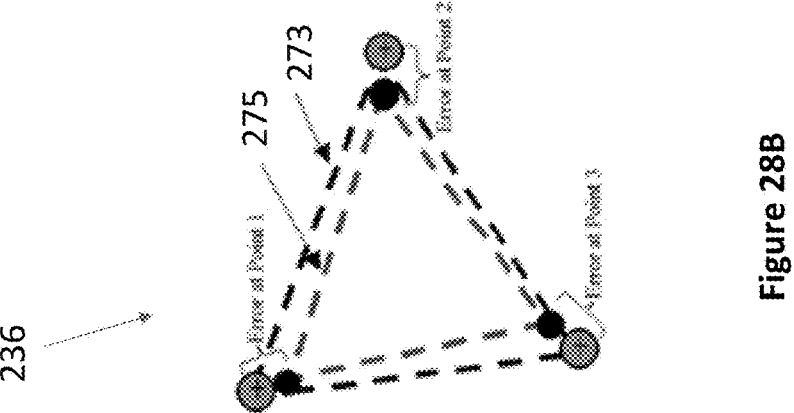
FIG. 28B is a plan view of an exemplary optimization analysis of an exemplary part for use with the system of FIG. 28A.
Figure 28A:
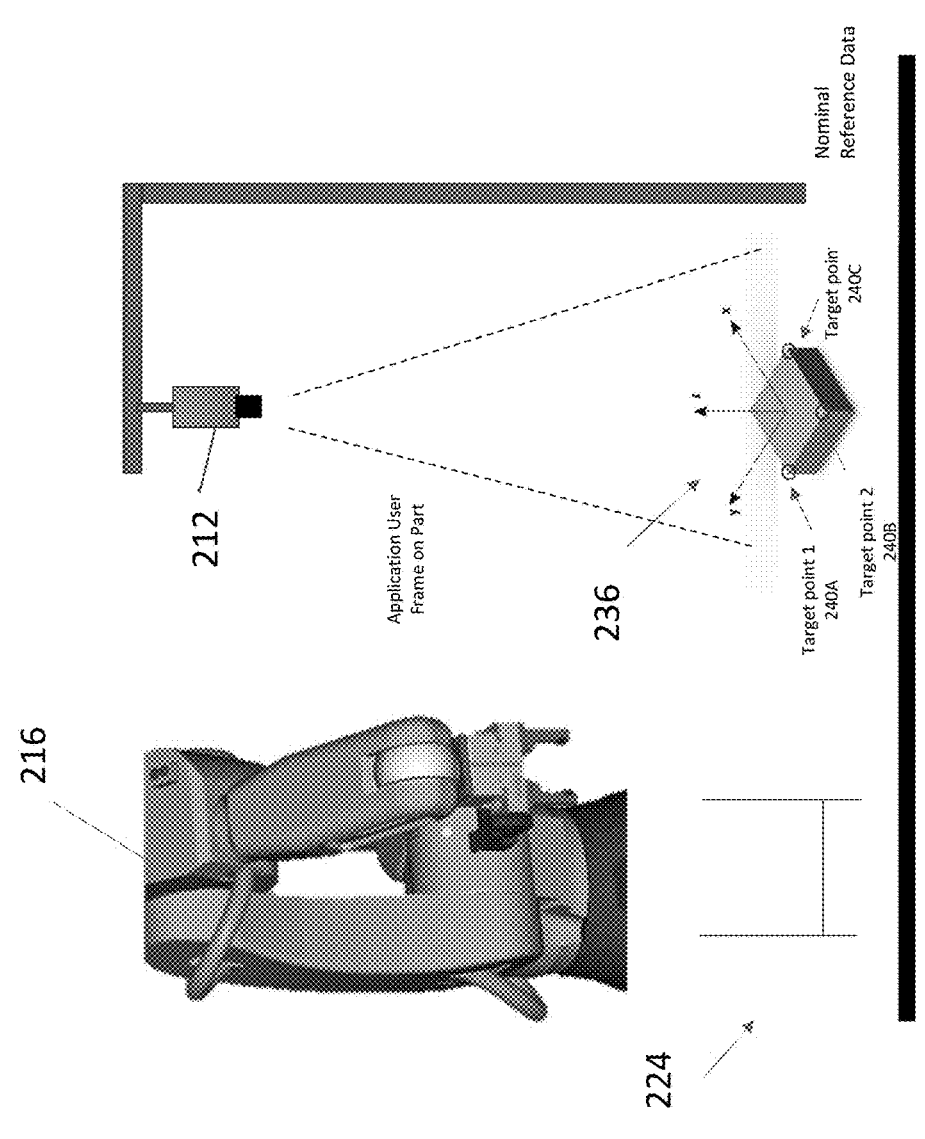
FIG. 28A is a perspective view of an exemplary machine vision system analyzing an exemplary part with exemplary identified target points for use with the system of FIG. 19.
Figure 29:
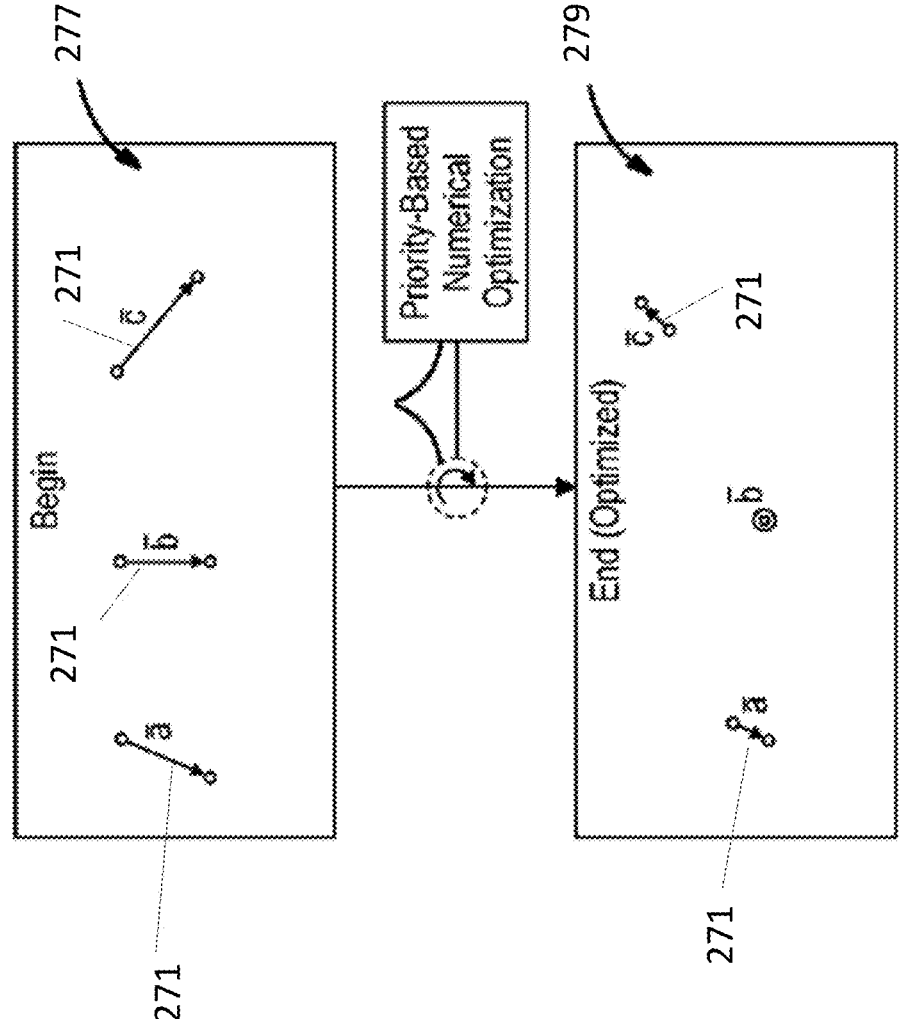
FIG. 29 is a plan view of an exemplary optimization analysis for use with the system of FIG. 19.

FIG. 24 illustrates various exemplary parts 236 which may be manipulated by the system 210 to create various subassemblies or assemblies 220.

FIG. 25 through FIG. 29 illustrates exemplary logic and related components for the system 210 to move parts 236 from the first location 239 to the second location 241. The controller 230 may comprise one or more processors 253 and/or electronic storage device 255. An assembly table 257, workpiece table 259, and/or target point table 261 may be stored in the memory 255. A learning software algorithm 263 may be stored in the memory 255.

The workpiece table 259 may comprise a list of parts 236, such as by part identifier, required to create a finished subassembly or assembly 220. The assembly table 257 may comprise a list of subassemblies or assemblies 220, such as by assembly identifier or subassembly identifier, actually or planned to be created by the system 210. The target point table 261 may comprise one or more target points 240 for each part 236. Such target points 240 may include, but are not necessarily limited to, target points 240 for the first location 239 and/or the second location 241. In this way, the workpiece table 259 may provide a link between the parts 236 to be picked up and the finished subassembly or assembly 220 to be created. The target points table 261 may comprise one or more target points 240 for each part 259, thus providing a link between the parts 236 to be formed into the subassembly or assembly 220.

The controller 230 may be configured to initially populate the target point table 261 with actual measurement data which may be obtained using the machine vision system 212. Scans may be made of one or more parts 236 and/or final locations for such parts to provide said actual target points 240. In exemplary embodiments, such target points 240 may comprise coordinates for actual or virtual datums on the part(s) 236 such as but not limited to points, edges, holes, surface features, combinations thereof, or the like. Such target points 240 may be extracted by the machine vision system 212 using machine vision or image analysis and the locations of these relevant target points 240 may be stored as measured coordinates in the target point table 261. These target points 240 may be expressed with respect to a reference frame associated with the workpiece 236 being measured (user frame). Alternatively, if desired, the target points 240 may be expressed with respect to a reference frame associated with the workstation's docking station 224, the materials handling robot 216, the gripping element 250, a joining robot 214, other surface, location, or the like.

In exemplary embodiments, the desired target points 240 may be developed from scanning a reference of idealized part 236. In other exemplary embodiment, such target points 240 may be pre-programmed. Multiple target points or datums 240 may be developed.

The target point table 261 may comprise a weighting value. The weighting value may be assigned for some or all of the target points 240 in the target point table 261. The weighting values may be utilized by the optimization algorithm 263 stored at the controller 230 to control which target point-to-target point relationships need to be relatively tightly constrained, and which can be relatively relaxed. By allowing weighted control over which relationships dominate the pickup, the controller 230 may calculate an optimal pick up solution that respects the design engineers' overall vision for the picked-up article 220. In this way, various size and shape parts 236, such as but not limited to square, round, triangle, hat channels, long, short and any other shapes and sizes, may be picked up. The weighting may be utilized to prioritize which measured target points 240 to desired target points 240 need to be the closest to one another. The weighting values may not be a simple weighted average. Instead, the weighting values operate more as a ranking system.

An optimized location of the target points 240 may include positioning the workpiece 236 in a manner which minimizes the effect that the target points 240 of two or more workpieces 236 have on the magnitude of the variation in the fabrication of the overall subassembly or assembly 220. The optimized location of the target points 240 is not necessarily the location that minimizes the variation between the nominal location of each target point 240 and the actual location of each target point 240, as in a least square's regression analysis. The several target points 240 may have differing levels of influence on the magnitude of variation in the pickup process of the article 220. Thus, the controller 230 may be configured to employ a prioritization technique using the weighted values by way of the A.I. optimizing algorithm 263. In this way, the several target points 240 may be prioritized in the optimization algorithm such that the target point or target points 240 that most influence the magnitude of variation in the workpiece 236 can be oriented as close as possible to their nominal, desired target point positions to thereby reduce the magnitude of variation in the article 220. For example, without limitation, some tolerances may be somewhat arbitrary and that an out-of-tolerance situation for one target point 240 does not necessarily render the article 220 defective or inoperative. However, limits may optionally be placed on the optimization algorithm 263 that would not permit the location of one or more target points 240 to be positioned at an out-of-tolerance position which could lead to no pick of the part 236.

The target point table 261 may further comprise calculated coordinates for each of the target points 240. Initially, these calculated coordinate data target points 240 may be unpopulated. The optimization algorithm 263 may be configured to use these calculated coordinates storage locations to store the intermediate and ultimately the final calculated values where each of the target points 240 need to be in the final optimized pick up solution.

The target point table 261 may comprise all target points 240 that are pertinent to the workpiece 236. These target points 240 may include all datums that need to be used to properly orient and/or otherwise operate the gripping elements 250. These target points 240 may include all robots 214, 216, locator holes, and other locator surfaces that are used to line up the workpiece 236 with the gripping elements 250 (e.g., mating jaws) found on the docking station 224. Thus, in addition to workpiece 236 target point data, the target point table 261 may also comprise target point location data of the docking station 224 or other reference point(s) used during the pickup process. This may include the location of all gripping elements 250, or other locator structures found on the docking station 224.

If not already expressed relative to a common reference system, the A.I. optimization algorithm 263 may be configured to perform any necessary coordinate translation so that all coordinates are expressed relative to the common reference system, such as but not limited to, the reference system of the docking station 224, material handling robot 216, gripping element 250, or the like. In this regard, one gripping element 250 or other point within the docking station 224 or material handling robot 216 may be designated as the primary locator. This primary locator may be held stationary (i.e., not adjusted by the processor controlled linear motors) and may serve as the origin point (0,0,0) of the common reference system, though such is not required.

The processor 253 may be configured to accesses the data structures within memory 255, including the tables 257, 259, 261, and may be configured to execute the A.I. optimizing algorithm 263. The optimizing algorithm 263 may include at least the following steps which are provided for example, without limitation, and which may be repeated, applied in any order, omitted, and/or added to:

1. Designate an origin of a common reference frame, such as about the docking station 224, the gripping element 250, material handling robot 216, or the like, and store this location in the target point table 261 as the origin (e.g., 0,0,0). The reference frame may be in a different position. For example, the global coordinate system for a car assembly 220 may be placed outside the boundary of the docking station 224, work area, gripping element 250, material handling robot 216, or the like. In such a case, the algorithm 263 may be configured to map a transformation matrix of the coordinates into the common docking station 224, gripping element 250, material handing robot 216, or the like.

2. Represent the coordinates of the docking station 224, gripping element 250, material handing robot 216, or the like as variables (to be determined) in the target point table 261.

3. Express all measured coordinates in the common reference frame. Preferably this common reference frame is that of the workstation docking station 224, docking station 224, gripping element 250, material handing robot 216, or the like, though such is not required. This may be accomplished by either acquiring the measured coordinates using the machine vision system 212 that is calibrated to the common reference system. Alternatively, or additionally, this may be accomplished by performing matrix transformation of the measured coordinates in workpiece reference frame into the common reference frame.

4. Using the connected-relationship data stored in the assembly table 257 (e.g., ingested from the CAD or other computer aided design or assembly software data), construct a matrix of ordered pairs to represent each pair of mating target points 240 for the parts 236 of the subassembly or assembly 220 and store as initial calculated coordinates in the target point table 261. In the constructed matrix, each calculated coordinate may be represented by a test vector of yet to be determined length and direction. The vector may have its head coincident with one of the mating target points 240 and its tail on the other of the mating target points 240.

5. Through an optimization process using priority-based numerical optimization that takes the stored weighting values into account, computationally iterate through one or more iterations to computationally seek the best fit between the measured target points 240 and the desired target points 240 for each calculated coordinate pair, giving precedence to target points 240 assigned a relatively higher weight, such that the lengths of all test vectors are minimized but that test vectors for relatively higher weighted pairs are prioritized to be shortened in length. This algorithm may not be an averaging algorithm. Instead, the algorithm may be configured to prioritize relatively higher weighted target points 240 to reflect their importance to the build process and the end-user. In this way, the algorithm may utilize the weighting values more as a ranking system. The algorithm may utilize learning, artificial intelligence type techniques. The algorithm may be non-linear multi-object algorithm. The algorithm can handle hundreds of target points 240 across multipole parts in a single optimization. The algorithm may be built with C++ and may run on a DOS or Linux operating system industrial PC. The algorithm may take input data from processor 253, including reference and measured data for the all the target points 240 in the target point table 261 and compute a robotic path for the material handling robots 216 that allows the pickup and placement system 210 to not only find and pick the part 236 correctly, but also places the part 236 in its geometrically designed tolerance range, ready for joining such as by way of the joining robots 214.

6. When the best fit is found, solve for the positions of all material handling robots 216, docking stations 224, and/or gripping elements 250.

7. Use the calculated positions of the moveable locators and positioning structures to drive the linear motors to adjust the material handling robots 216 and/or gripping elements 250 in physical space. For example, a scan may be previously been performed of a desired location for the part 236, or such a location may be preprogrammed.

The optimization algorithm 263 may be configured to utilize test vectors to seek the best fit, optimal solution. As shown particularly in FIGS. 27A-28B, three exemplary target points 240A, 240B, 240C may be selected on an exemplary workpiece 236. The three target points, referred to in the figures as Target Point 1, 2, 3, may be selected in reference nominal space, with their respective measured target points 240A, 240B, 240C (in this case represented by small circles) placed approximately on corner edge points. Between each pair of mating target points 240, a test vector 271 may be defined in virtual space within the controller 230. Because each workpiece 236 is represented in the common coordinate frame, each of these test vectors 271 may reference the origin point of the coordinate system. By way of example, without limitation, we shall assume that workpiece 236 is oriented on a pallet in an actual position 273 that differs from the designed position 275 (nominal or reference position). Each target point 240 remains of unknown position until the optimization algorithm 263 is run. This includes the position of all target points 240, which corresponds to actual measured data. When the optimization algorithm 263 is run, a solution may be calculated which minimizes the length of all of the test vectors 271 (e.g., by utilizing the 3-dimensional measured data and ideal nominal reference data), taking individual weighting of each pair of mating target points 240 into account. The effect of the algorithm 263 may be to determine the final location of all target points 240 in the optimal arrangement. This has been diagrammatically illustrated in at least FIG. 29 which shows the condition of three exemplary test vectors 271 *a, b* and *c* before any optimization is performed at 277. The test vectors 271 each have a direction and length sufficient to connect its respective pair of mating points. Because no optimization has been performed at this stage, these test vectors may be of any length and of any direction.

As the priority-based numerical optimization algorithm 263 is run, such as but not limited to iteratively or recursively a number of times, the optimal lengths and directions of test vectors 271 *a, b* and *c* may be ultimately arrived at as shown at 279. In this example, test vector 271 *b* received highest weighting priority, resulting in its associated pair of begin and end points being coincident. The other test vectors 271 *a* and c have been shortened in length, although not as much as vector b. Note that for this example, which is provided without limitation, test vectors 271 *a* and *c* have received adjustment in pointing direction as well.

Essentially, the optimized change in length and direction of the test vectors 271 may correspond with a shift in the three-dimensional position of the workpieces 236 to which the corresponding target points 240 are associated. Once the optimized solution 279 is achieved, the optimized positions of all target points 240 may be fixed in reference coordinate space. That is, the position of each target point 240 may be determined by first establishing the locations relative to the origin (0,0,0) of the workpiece 236. Then the locations of the contact points for pickup may be determined by minimizing the test vectors 271, using the optimized test vectors adjustments which then can be transformed using Euler angles transformations to robot coordinates.

As noted above, once the best fit 279 for the workpieces 236 has been determined in virtual space, the controller 230 may be configured to solve for the required coordinates of the material handling robots 216 and/or gripper elements 250 and automatically move to proper pickup locations.

Having thus presented an explanation of the optimization algorithm 263, use of the overall system 210 may now be discussed.

Joining Workpieces Using Variable Position Locators:

An exemplary method for performing an A.I. pick and place operation at a given workstation may begin with calibration of the machine vision system 212. Once calibrated, the parts 236 to be picked up may be identified using the machine vision system 212. The geometry and shape of the parts 236 may vary without substantially affecting the method for identifying target points 240 and orienting the materials handling robot 216 to actual workpiece 236 configuration.

The machine vision system 212 may collect and analyze 3-dimensional data regarding selected targets points on a workpiece 236. In the example shown, without limitation, which depicts a box 236 to be picked up, the target points comprise 3-targets 240A, B, C. Each target point 240 may be established as a reference position based on a design range.

The controller 230 may determine, based on a scan of the part 236 by the machine vision system 212, if the several target points 240 are in their optimized location, such as within a predetermined range of desired target points 240. If so, the controller 230 may program the robots 214 to pick up the workpiece 236 as it normally would. If not, the optimization algorithm 263 may be performed. Specifically, if the target points 240 are not in their optimized locations, the gripping elements 250 or other components of the material handling robots 214 may be moved by motors, such as but not limited to linear servo motors, as required to position part 236 such that the target points 240 on the workpieces 236 are at the optimized location 279 for pickup. The system 210 may confirm the positioning of the target points 240 in their optimized locations 279 (such as within predefined limits) by way of a second scan by the machine vision system 212 and to permit the controller 230 to confirm that the optimized locations have not changed. The desired target points 240 may be developed from scans of an idealized reference part 236 and/or the location where such parts 236 are to be placed.

The system 210 may be configured to adjust the position of parts 236 relative to one another to fit within an overall design scheme while minimizing the amount of adjustment that is needed to each individual part 236. This is particular helpful as parts may be shifted in placement when presented to materials handling robots 214 and/or when gripped by gripping elements 250 or may be provided in varying sizes and/or shapes. While such shifts and/or variations may be small, they may lead to larger gaps in the overall subassembly or assembly 220, leading to a defective article 220. The controller 230 may utilize a machine vision system 212 to identify parts for pickup and placement to form an assembly 220 based on parts 236 assigned to an assembly 220 as laid out in the workpiece table 259. Target points 240, which may comprise datums, for each part 236 may be determined from a target point table 261 and/or initially determine from scans of reference versions of the parts 236 and/or the part's 236 desired location by the machine vision system 212. Each actual measured target point 240 may be matched with a desired target point 240 to form a coordinate pair. For example, without limitation, some coordinate pairs may be related to a pick up location and other may be related to a placement location.

The controller 230 may be configured to run a multi-iterative best fit process to determine, using the test vectors 271, and accounting for weighting assigned to the target points 240 at the target point table 261, the minimum amount of movement of each part 236 needed to create an in-tolerance article 220. Once a best fit solution 279 is found, it may be executed and a confirmation scan by the machine vision system 212 may optionally be performed and further adjustments may be made as needed.

Relatively higher weighted target points 240 may be prioritized. For example, without limitation, while the solution having the overall shortest length summed vectors may be desired (reflecting overall lowest amount of movement), a slightly longer overall length summed vectors solution may instead be selected where the vector associated with the relatively highest weight is the shortest compared to other potential solutions. In this way, relatively close tolerance parts (which may be assigned higher weights) may be made more likely to stay in tolerance by permitting less shifting between their actual position and their desired position. Likewise, relatively loose tolerance parts (which may be assigned lower weights) may be permitted greater latitude in shifting, as such movement is unlikely to result in an out of tolerance article 220.

In exemplary embodiments, the system 210 may be configured to provide at least the following movements: positioning, holding, immobilizing, and interfacing, each of which is further described herein. Positioning-precisely aligning and locating the part using the algorithm 263 and robot 216 to place a part 236 within its design tolerance range. Holding-eliminating the degrees of freedom of the part 236 with respect to the robot 216, docking station 224, or the like to hold it in geometrical constrained status. Immobilizing-resisting movement and/or deflections of the part 236 against the forces of the manufacturing operations. The following types of immobilizing are provided as non-limiting examples: resist forces from contacting part during joining; and resist forces from the joining equipment such as joining robots 214. Interfacing-allowing interfacing and avoiding interference between various pairs of agents during manufacturing operations. The following types of interfacing are provided by way of non-limiting example: part-to-part (avoid gripping elements 250 from getting in between parts 236 joined); and part-to-tool (avoid gripping elements 250 from obstructing access of the joining robots 214).

Exemplary system 210 specifications include, without limitation, the ability to move parts weighing 200 lb and smaller, a stroke range of 500 mm (250 mm of travel per jaw), non-slippage, and one or more compliance devices 281 in center of actuator of each gripping element 250 to stabilize large flexible material parts 14 mm of compression on z-axis. The system 210 may then travel the robot 216 into the part 236, compressing that spring to a certain depth, then sensors may detect the Z stroke and the controller 230 may register the compression and send a command to the servo to close the jaws 250. Use of a machine vision system 212 to acquire target point data and present to the algorithm 263 to provide accurate position to identify to the controller 230 the position of the part 236 to a tight accuracy and so that the robots 216 may be best positioned before closing the gripper 250.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may be personal computers, smartphone, tablets, databases, servers, or the like. The electronic connections and transmissions described herein may be accomplished by wired or wireless means.

What is claimed is:

1. A system for learning software assisted, at least partially fixtureless assembly of parts into an assembly, said system comprising:
   a robot;
   a machine vision system positioned to view a work area;
   one or more support objects within the work area;
   a controller in electronic communication with said robot and said machine vision system, said controller comprising one or more non-transitory electronic storage devices storing software instructions, which when executed, configure one or more processors to:
   derive measured target points from one or more images of a part in the work area received from the machine vision system;
   perform an iterative analysis to determine a best fit solution for moving said part adjacent to another part for forming the assembly such that each of said measured target points is within a predetermined range of an associated one of desired target points for said part, where the other part is located at said one or more support objects;
   convert said measured target points to a common reference frame; and
   command movement of said part, by way of the robot, according to said best fit solution as converted such that said part is moved and secured adjacent to the other part in a fixtureless manner.

2. The system of claim 1 further comprising:
   one or more databases provided at, or in electronic communication with, said controller, wherein said one or more databases comprise said desired target points, and wherein at least some of said desired target points are associated with weightings.

3. The system of claim 2 wherein:
   said software instructions, when executed, further configure said one or more processors to:
   determine, based on one or more images received from said machine vision system, if said target points of said part are within said predetermined range of said desired target points; and
   adjust said weightings where said controller determines that said target points of said part are not within said predetermined range of said desired target points.

4. The system of claim 3 wherein:

said software, when executed, further configure said one or more processors to: determine said best fit solution by fitting vectors between each of said measured target points and said associated one of said desired target points to develop a solution set, wherein said best fit solution is a solution from said solution set having the overall shortest length of summed vectors while prioritizing higher weighted desired target points over other, lower weighted desired target points.

5. The system of claim 4 wherein:

said best fit solution comprises the solution of said solution set where said vector for said distance between said desired target point and said measured target point is smallest for said highest weighted desired target point.

6. The system of claim 5 wherein:

said higher weighted desired target points are assigned to ones of parts having smaller in magnitude tolerance requirements and said lower weighting weighted desired target points values are assigned to ones of said parts having larger in magnitude tolerance requirements.

7. The system of claim 6 wherein:

said iterative analysis utilizes at least one artificial intelligence technique.

8. The system of claim 1 wherein:

said parts are located at a bin;

said parts comprise multiple types of parts; and said software instructions, when executed, further configure said one or more processors to: perform, by way of said machine vision system, an initial scan of said parts located at said bin.

9. The system of claim 8 wherein:

said software instructions, when executed, further configure said one or more processors to: designate a location at said one or more support objects as an origin of said common reference frame.

10. The system of claim 9 wherein:

said one or more support objects comprises a docking station, a table, or a surface.

11. The system of claim 8 further comprising:

said software instructions, when executed, further configure said one or more processors to: designate a gripping portion of said robot as said common reference frame.

12. The system of claim 11 wherein:

said software instructions, when executed, further configure said one or more processors to: derive at least some of said desired target points from one or more images of a reference version of said part received from the machine vision system.

13. The system of claim 1 wherein:

each of said target points comprise one or more virtual datums associated with surface features of said part.

14. The system of claim 1 wherein:

said software instructions, when executed, further configure said one or more processors to: secure said part adjacent to the other part such that said part is supported exclusively by one or more of the robot, the other part, and the one or more support objects at least temporarily.

15. The system of claim 1 wherein:

said software instructions, when executed, further configure said one or more processors to: secure said part adjacent to the other part such that said part is supported exclusively by the robot and/or the one or more support objects at least temporarily.

16. The system of claim 1 wherein:

said software instructions, when executed, further configure said one or more processors to: join said part to the other part to form the assembly while said part remains secured adjacent to the other part.

17. The system of claim 16 wherein:

the part is joined to the other part by one or more of: welding, fastening, and adhesion; and said software instructions, when executed, further configure said one or more processors to: carry out the joining in an at least partially automated fashion by way of the robot or another robot.

18. The system of claim 1 wherein:

each of the measured target points and desired target points comprise a coordinate pair, stored at one or more tables in association with an identifier.

19. A method for learning software assisted, at least partially fixtureless assembly of parts into an assembly, said method comprising:

deriving, by way of a controller, measured target points from one or more images of a part in a work area received from a machine vision system positioned to view the work area;

performing, by way of the controller, an iterative analysis to determine a best fit solution for moving said part adjacent to another part for forming the assembly such that each of said measured target points is within a predetermined range of an associated one of desired target points for said part, where the other part is located at a support object or objects within the work area;

converting, by way of the controller, said measured target points to a common reference frame; and moving, by way of electronic command issued from the controller, said part, by way of the robot, according to said best fit solution as converted such that said part is moved and secured adjacent to the other part in a fixtureless manner.

20. A system for learning software assisted, at least partially fixtureless assembly of parts into an assembly, said system comprising:

a robot;

a machine vision system positioned to view a work area;

one or more support objects within the work area;

a controller in electronic communication with said robot and said machine vision system; and one or more databases provided at, on in electronic communication with, said controller, wherein said one or more databases comprise desired target points, at least some of which are associated with weightings;

said controller comprising software instructions stored on one or more non-transitory electronic storage devices which when executed, configure one or more processors to:

perform, by way of the machine vision system, an initial scan of the parts to identify a candidate part of a specific type, which are stored at a bin within the work area, wherein said bin contains different types of parts;

derive measured target points from one or more images of the candidate part in the work area received from the machine vision system;

perform an iterative analysis to determine a best fit solution for moving said candidate part adjacent to another part of different type for forming the assembly by using a multi-factor vector fitting technique and at least one artificial intelligence technique such that each of said measured target points is within a predetermined range of an associated one of desired target points for said candidate part, where the other part is located at said one or more support objects, and where, based on one or more images received from said machine vision system, said target points of said candidate part cannot be placed within said predetermined range of said desired target points, adjust said weightings until said target points of said candidate part are placed within said predetermined range of said desired target points;

perform an iterative analysis to determine a best fit solution for moving said candidate part adjacent to another part for forming the assembly such that each of said measured target points is within a predetermined range of an associated one of desired target points for said candidate part, where the other part is located at said one or more support objects;

convert said measured target points to a common reference frame, where said common reference frame designates a location at said one or more support objects as an origin;

command movement of said part, by way of the robot, according to said best fit solution as converted such that said candidate part is moved and secured adjacent to the other part in a fixtureless manner such that said candidate part is supported exclusively by the other part and/or the one or more support objects; and command joining of said candidate part and the other part, by way of the robot or another robot, while the candidate part is supported exclusively by the other part and/or the one or more support objects, at least temporarily.

\* \* \* \* \*